United States Patent
Sankaran et al.

(10) Patent No.: US 7,297,619 B2
(45) Date of Patent: Nov. 20, 2007

(54) SYSTEM AND METHOD FOR MAKING NANOPARTICLES USING ATMOSPHERIC-PRESSURE PLASMA MICROREACTOR

(75) Inventors: R. Mohan Sankaran, Cleveland, OH (US); Konstantinos P. Giapis, Pasadena, CA (US); Richard C. Flagan, Pasadena, CA (US); Dean Holunga, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 11/123,884

(22) Filed: May 4, 2005

(65) Prior Publication Data

US 2006/0042414 A1 Mar. 2, 2006

Related U.S. Application Data

(60) Provisional application No. 60/604,118, filed on Aug. 24, 2004.

(51) Int. Cl.
*H01L 21/20* (2006.01)

(52) U.S. Cl. .................... 438/584; 977/844; 977/880; 118/723 R

(58) Field of Classification Search ............ 118/723 R; 977/880, 963, 844

See application file for complete search history.

(56) References Cited

U.S. PATENT DOCUMENTS

| | | | | |
|---|---|---|---|---|
| 5,212,708 A | * | 5/1993 | Schanz et al. | 372/55 |
| 5,368,702 A | * | 11/1994 | de Nora | 205/373 |
| 5,514,350 A | * | 5/1996 | Kear et al. | 422/198 |
| 5,935,461 A | * | 8/1999 | Witherspoon et al. | 219/121.59 |
| 6,230,572 B1 | * | 5/2001 | Pui et al. | 73/863.21 |
| 6,258,417 B1 | | 7/2001 | Goswami et al. | |
| 6,259,101 B1 | * | 7/2001 | Wexler et al. | 250/423 P |

(Continued)

OTHER PUBLICATIONS

Belomoin et al., "Observation of a magic discrete family of ultrabright Si nanoparticles," Applied Physics Letters, (Feb. 4, 2002), 80(5): 841-843.

(Continued)

*Primary Examiner*—Michelle Estrada
*Assistant Examiner*—Jarrett J Stark
(74) *Attorney, Agent, or Firm*—Townsend and Townsend and Crew LLP

(57) ABSTRACT

A system and method for making nanoparticles. The system includes a first cathode including a first metal tube associated with a first end and a second end, a first anode including a second metal tube associated with a third end and a fourth end, and a first container including a first gas inlet. The first end and the third end are located inside the first container. The first end and the third end are separated by a first gap, the first metal tube is configured to allow a first gas to flow from the second end to the first end, and the first container is configured to allow a second gas to flow from the first gas inlet into the second metal tube through at least a first part of the first gap.

49 Claims, 19 Drawing Sheets

U.S. PATENT DOCUMENTS

| | | | |
|---|---|---|---|
| 6,379,419 B1* | 4/2002 | Celik et al. ................... 75/346 |
| 6,530,944 B2 | 3/2003 | West et al. |
| 6,582,921 B2 | 6/2003 | Elghanian et al. |
| 6,600,127 B1* | 7/2003 | Peterson et al. ........ 219/121.43 |
| 6,700,329 B2 | 3/2004 | Giapis et al. |
| 6,884,404 B2* | 4/2005 | Anazawa et al. ......... 423/447.1 |
| 7,097,675 B2* | 8/2006 | Detering et al. ........... 48/127.9 |
| 2002/0127224 A1 | 9/2002 | Chen |
| 2003/0034486 A1 | 2/2003 | Korgel |
| 2003/0051992 A1* | 3/2003 | Rappa et al. ................ 204/164 |
| 2004/0036130 A1 | 2/2004 | Lee et al. |
| 2004/0229447 A1* | 11/2004 | Swihart et al. ............. 438/507 |

OTHER PUBLICATIONS

Camata et al., "Size classification of silicon nanocrystals," Appl. Phys. Lett. (May 27, 1996), 68(22):3162-3164.

Delerue et al., "Theoretical aspects of the luminescence of porous silicon," Phys. Rev. B (Oct. 15, 1993) 48(15):11024-11036.

Hill et al., "Size dependence of excitons in silicon nanocrystals," Phys. Rev. Lett. (Aug. 7, 1995), 75(6): 1130-1133.

Garcia, "Size dependence of lifetime and absorption cross section of Si nanocrystals embedded in SiO 2,", Appl Phys Lett., (Mar. 10, 2003), 82(10).

Holmes et al., "Highly luminescent silicon nanocrystals with discrete optical transitions," J. Am. Chem. Soc. (2001) 123, 3743-3748.

Li et al., "A process for preparing macroscopic quantities of brightly photoluminescent silicon nanoparticles with emission spanning the visible spectrum", Langmuir, (2003) 19, 8490-8496.

Littau, "A luminescent silicon nanocrystal colloid via a high-temperature aerosol reaction," J. Phys Chem, 97(6):1224-1230.

Masala et al., "Synthesis routes for large volumes of nanoparticles," Annual Review of Materials Research (2004), 34:41-81.

Lu et al., "Growth of single crystal silicon nanowires in supercritical solution from tethered gold particles on a silicon substrate," Nano Lett. (2003) 3(1): 93-99.

Orii et al., "Tunable narrow-band light emission from size-selected Si nanoparticles produced by pulsed laser ablation", Appl. Phys. Lett., (Oct. 20, 2003) 83 (16):3395-3397.

Ostraat et al., "Ultraclean two-stage aerosol reactor for production of oxide-passivated silicon nanoparticles for novel memory devices," J. Electrochem. Soc (May 2001), 148(5): G265-G270.

Puzder et al., "Surface chemistry of silicon nanoclusters," Phys. Rev. Lett. (Mar. 2002) 88 (9): 097401-1. 4 pages total.

Rao, "Synthesis of nanophase silicon, carbon, and silicon carbide powders using a plasma expansion process," J. Mater. Res. (Aug. 1995), 10(8):2073-2084.

Mohan Sankaran et al., "Hollow cathode sustained plasma microjets: Characterization and application to diamond deposition", J. Appl. Phys. (2002) 92:2406.

Mohan Sankaran, High-pressure microdischarges as microreactors for materials applications—Chapter 6: Nanoparticle synthesis in short-residence microreactor), Retrieved from the Internet <<http://etd.library.caltech.edu/etd/available/etd-06012004-152711/unrestricted/thesis.pdf>> California Institute of Technology, Pasadena, California (May 27, 2004), pp. 103-115.

Mohan Sankaran, "High-Pressure micro-discharges in etching and deposition application," J. Phys. D: Appl. Phys, (Dec. 7, 2003), 36 (23): 1-8.

Mohan Sankaran et al., "Synthesis of Blue Luminescent Si Nanoparticles Using Atmospheric-Pressure Microdischarges," Nano Lett., (2005), 5 (3):537-541.

Stoffels et al., "Dust formation and charging in an Ar/SiH 4 radio-frequency discharge," J. Vac. Sci. Tech. A (Mar./Apr. 1996) 14(2):556-561.

Suzuki et al., "Monodispersed, nonagglomerated silicon nanocrystallites," Applied Physics Letters (Apr. 2, 2001), 78(14):2043-2045.

Wilcoxon et al., "Optical and electronic properties of Si nanoclusters synthesized in inverse micelles," Phys. Rev., (Jul. 15, 1999) B 60(4) 2704-2714.

Wilson, "Quantum confinement in size-selected, surface-oxidized silicon nanocrystals," Science (1993), 262(5137):1242-1244.

Wolkin, "Electronic States and Luminescence in Porous Silicon Quantum Dots: The Role of Oxygen," Phys. Rev. Lett. (Jan. 4, 1999) 82(1):197-200.

Yoshida et al., "Electroluminescence of silicon nanocrystallites prepared by pulsed laser ablation in reduced pressure inert gas", *Journal of Applied Physics*, (May 15, 1998) 83 (10): 5427-5432.

* cited by examiner

SYSTEM AND METHOD FOR MAKING NANOPARTICLES USING ATMOSPHERIC-PRESSURE PLASMA MICROREACTOR

CROSS-REFERENCES TO RELATED APPLICATIONS

This application claims priority to U.S. Provisional No. 60/604,118 filed Aug. 24, 2004, which is incorporated by reference herein.

STATEMENT AS TO RIGHTS TO INVENTIONS MADE UNDER FEDERALLY SPONSORED RESEARCH OR DEVELOPMENT

Work described herein has been supported, in part, by NSF Grant No. CTS-0404353. The United States Government may therefore have certain rights in the invention.

The following two commonly-owned co-pending applications, including this one, are being filed concurrently and the other one is hereby incorporated by reference in its entirety for all purposes:

1. U.S. patent application Ser. No. 11/123,884, in the name of R. Mohan Sankaran, Konstantinos P. Giapis, Richard C. Flagan, and Dean Holunga, titled "System and Method for Making Nanoparticles Using Atmospheric-Pressure Plasma Microreactor"; and 2. U.S. patent application Ser. No. 11/123,885, in the name of R. Mohan Sankaran and Konstantinos P. Giapis, titled "System and Method for Making Nanoparticles with Controlled Emission Properties".

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates generally to the field of nanotechnology. More specifically, the invention provides a method and system for making nanoparticles using an atmospheric-pressure plasma microreactor. Merely by way of example, the invention has been applied to making silicon nanoparticles, but it would be recognized that the invention has a much broader range of applicability.

The promise of silicon-based optoelectronics has spurred intense interest in silicon nanoparticles (np-Si). Direct band gap transitions have been observed for np-Si. For example, stable photoluminescence (PL), tunable in the range between 700 and 350 nm, has been reported for np-Si smaller in size than the excitonic radius for bulk Si, which is about 4 nm. np-Si have been produced using a variety of techniques including colloidal growth, aerosol processes, plasma synthesis, and electrochemical etching. Many of these techniques involve a capping agent for protection from uncontrolled oxidation which, however, may introduce surface recombination states that alter the emission characteristics. From this perspective, aerosol techniques have an advantage since particles can be grown without capping agents and deposited directly onto a substrate.

FIG. 1 shows simplified conventional aerosol processes. Within an aerosol flow reactor, the following processes occur at different time scales and locations. For example, initial nucleation of particles results from the formation of a supersaturated vapor of gas precursors. Possible means of generating a vapor source include pyrolysis, laser ablation, spark ablation, and plasmas. In the early stages, particles grow by condensation of vapor at their surface and coalescent coagulation. Normally, these processes occur in a region near the vapor source where the temperature is high. As the particle concentration increases, collisions between particles become more frequent and agglomeration begins. Formation of these undesirable aggregates is usually found away from the vapor source as the temperature drops off. Hence the particles synthesized by the conventional aerosol processes often have a broad size distribution, which often necessitates post-synthesis size-selection and particle agglomeration. Notably, production of blue-light emitting np-Si has been challenging because of difficulties in limiting aerosol growth to small sizes and preventing particle coagulation.

Hence it is desirable to improve techniques for making silicon nanoparticles.

BRIEF SUMMARY OF THE INVENTION

The present invention relates generally to the field of nanotechnology. More specifically, the invention provides a method and system for making nanoparticles using an atmospheric-pressure plasma microreactor. Merely by way of example, the invention has been applied to making silicon nanoparticles, but it would be recognized that the invention has a much broader range of applicability.

According to an embodiment of the present invention, a system for making nanoparticles includes a first cathode including a first metal tube associated with a first end and a second end, a first anode including a second metal tube associated with a third end and a fourth end, and a first container including a first gas inlet. The first end and the third end are located inside the first container. The first end and the third end are separated by a first gap, the first metal tube is configured to allow a first gas to flow from the second end to the first end, and the first container is configured to allow a second gas to flow from the first gas inlet into the second metal tube through at least a first part of the first gap. The first cathode and the first anode are configured to generate a first plasma discharge at a first pressure equal to or higher than one atmospheric pressure, and the first plasma discharge is capable of being used for making a first plurality of nanoparticles.

According to another embodiment, a system for making nanoparticles includes a cathode including a first metal tube associated with a first inner diameter and including a first end and a second end, an anode including a second metal tube associated with a second inner diameter and including a third end and a fourth end, and a container including a gas inlet. The first end and the third end are located inside the container. The first end and the third end are separated by a gap, and the first container is configured to allow a gas to flow from the gas inlet into the second metal tube through at least a first part of the gap. The cathode and the anode are configured to generate a plasma discharge at a pressure equal to or higher than one atmospheric pressure, and the second inner diameter is lager than the first inner diameter.

According to yet another embodiment, a method for making nanoparticles includes providing a plasma microreactor. The plasma microreactor includes a cathode associated with a first end and a second end, an anode associated with a third end and a fourth end, and a container including a gas inlet. The first end and the third end are separated by a gap and located inside the container. Additionally, the method includes supplying a first gas flowing from the second end to the first end, supplying a second gas flowing from the gas inlet into the anode through at least a first part of the gap, starting a plasma discharge at a first pressure equal to or higher than one atmospheric pressure, and maintaining the plasma discharge at a second pressure equal to or higher than one atmospheric pressure. The maintaining the plasma discharge includes making a plurality of nanoparticles.

According to yet another embodiment, a system for making nanoparticles includes a cathode including a first metal tube associated with a first end and a second end, an anode including a second metal tube associated with a third end and a fourth end, and a container, the first end and the third end being located inside the container. The first end and the third end are separated by a gap, and the first metal tube is configured to allow a gas to flow from the second end to the first end. The cathode and the anode are configured to generate a plasma discharge at a pressure equal to or higher than one atmospheric pressure, and the plasma discharge is capable of being used for making a plurality of nanoparticles. The first metal tube is associated with a first inner diameter, the second metal tube is associated with a second inner diameter, and the second inner diameter is lager than the first inner diameter.

According to yet another embodiment, a method for making nanoparticles includes providing a plasma microreactor. The plasma microreactor includes a cathode associated with a first end and a second end, an anode associated with a third end and a fourth end, and a container. The first end and the third end are separated by a gap and located inside the container. Additionally, the method includes supplying a gas flowing from the second end to the first end, starting a plasma discharge at a first pressure equal to or higher than one atmospheric pressure, and maintaining the plasma discharge at a second pressure equal to or higher than one atmospheric pressure. The maintaining the plasma discharge includes making a plurality of nanoparticles.

Many benefits are achieved by way of the present invention over conventional techniques. For example, some embodiments of the present invention provide high-pressure microdischarges for the synthesis of nanometer-size silicon particles. For example, atmospheric-pressure microdischarges are used as short-residence time reactors for silicon nanoparticle synthesis. In one embodiment, the residence time of particle nucleation can be limited in the reactor to time scales on the order of milliseconds. In another example, charging of particles in plasma may prevent coagulation. In yet another example, high-pressure operation can accelerate particle growth.

Certain embodiments of the present invention can limit particle growth in the reaction zone allowing the production of ultrasmall nanoparticles with relatively narrow size distributions. For example, silicon nanoparticles are synthesized from a mixture of argon and silane in an atmospheric pressure plasma microreactor. Particles nucleate and grow to a few nanometers in diameter before their growth is abruptly terminated in the short afterglow. In another example, samples collected in solution can exhibit strong PL emission with a peak at 440 nm, indicative of particles with a core size smaller than 2 nm. In yet another example, size classification of the aerosol shows relatively narrow size distributions of agglomerates in the 2-5 nm range with $\sigma_g$=1.3. Some embodiments of the present invention collect silicon nanoparticles in solution immediately after synthesis. These collected particles exhibit strong blue photoluminescence that peaks at 420 nm, and the emission remains stable for months in ambient air. Certain embodiments of the present invention provide applications for luminescent properties of our np-Si in optical devices and fundamental studies to clarify the luminescence mechanism. Some embodiments of the present invention provide systems and methods whose synthetic routes can readily be applied to grow a range of metal and semiconductor nanoparticles.

Depending upon embodiment, one or more of these benefits may be achieved. These benefits and various additional objects, features and advantages of the present invention can be fully appreciated with reference to the detailed description and accompanying drawings that follow.

DETAILED DESCRIPTION OF THE INVENTION

The present invention relates generally to the field of nanotechnology. More specifically, the invention provides a method and system for making nanoparticles using an atmospheric-pressure plasma microreactor. Merely by way of example, the invention has been applied to making silicon nanoparticles, but it would be recognized that the invention has a much broader range of applicability.

Figure 1:
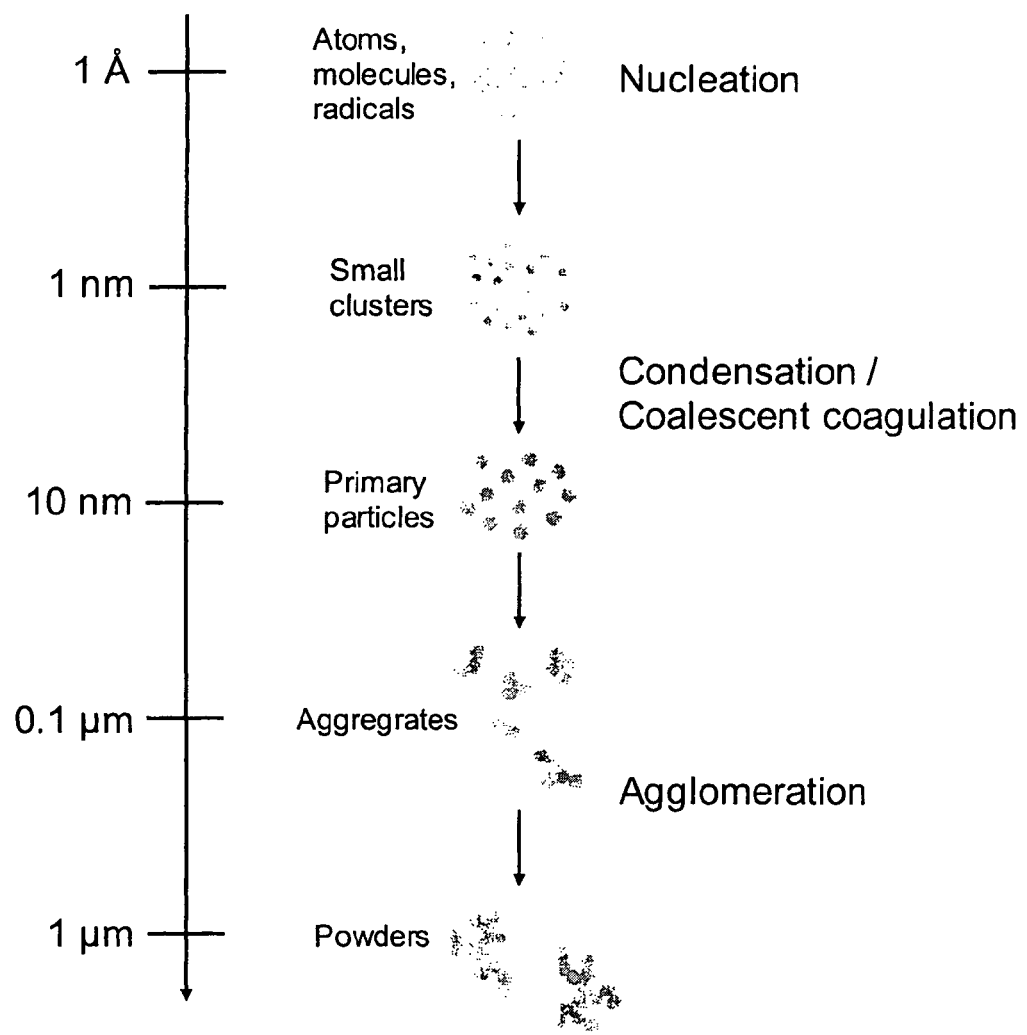
FIG. 1 shows simplified conventional aerosol processes.
Figure 2A:
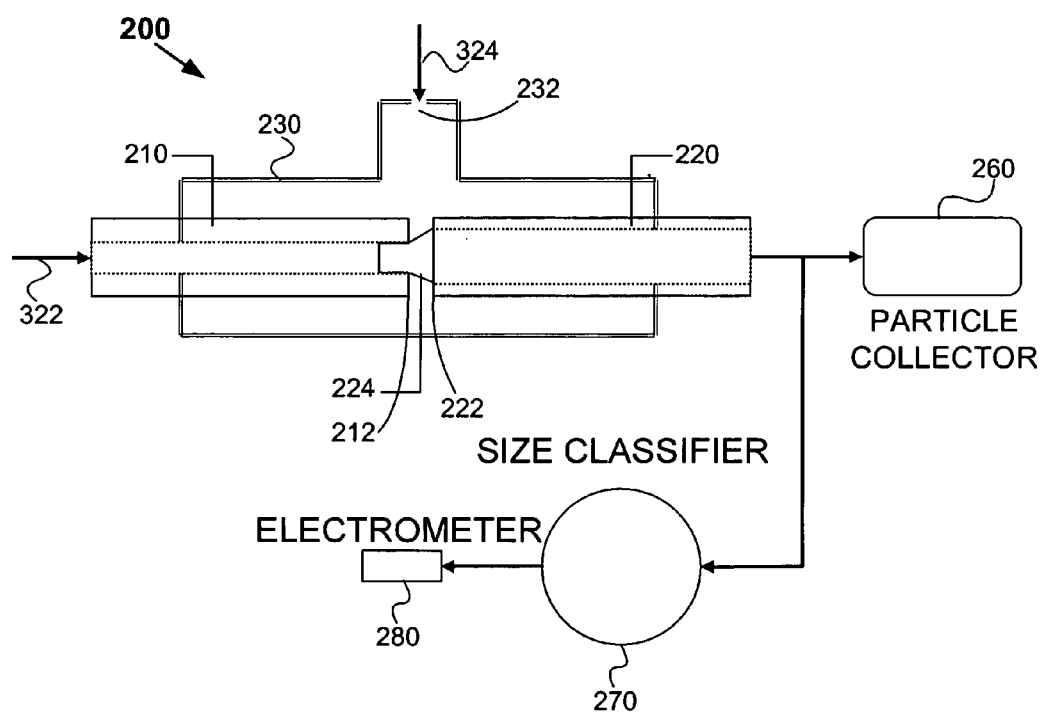
FIGS. 2(A) and 2(B) each show a simplified system for making silicon nanoparticles according to an embodiment of the present invention.
Figure 2B:
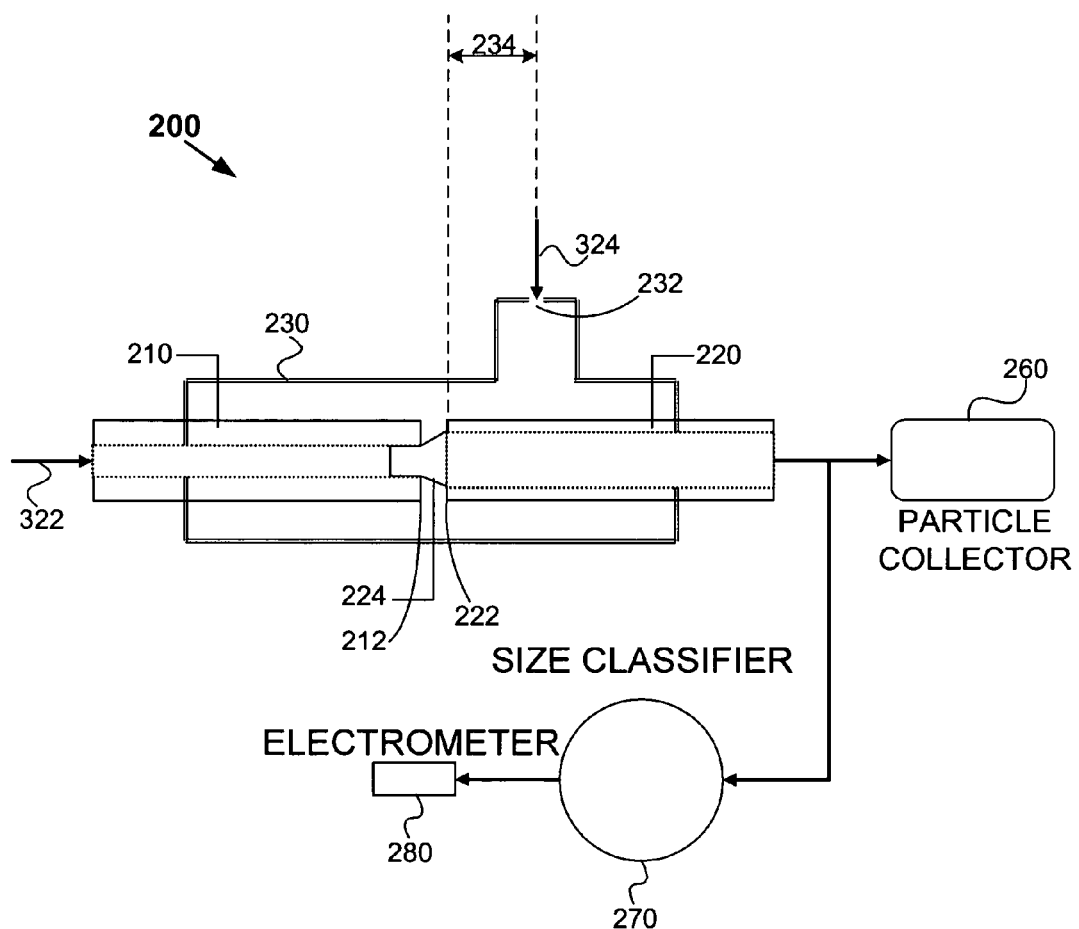

FIGS. 2(A) and 2(B) each show a simplified system for making silicon nanoparticles according to an embodiment of the present invention. These diagrams are merely examples, which should not unduly limit the scope of the claims. One of ordinary skill in the art would recognize many variations, alternatives, and modifications. A system 200 includes a cathode 210, an anode 220, a sealing tube 230, particle collector 260, a size classifier 270, and an electrometer 280. Although the above has been shown using a selected group of components for the system 200, there can be many alternatives, modifications, and variations. For example, some of the components may be expanded and/or combined. Other components may be inserted to those noted above. Depending upon the embodiment, the arrangement of components may be interchanged with others replaced. For example, the size classifier 270 and the electrometer 280 are removed. Further details of these components are found throughout the present specification and more particularly below.

The cathode 210 is made of a metal tube. For example, the metal tube includes a stainless steel capillary tube. The metal tube has an outer diameter and an inner diameter. For example, the inner diameter ranges from 10 µm to 250 µm. In another example, the inner diameter equals about 180 µm. The cathode 210 is connected a voltage source. For example, the cathode 210 is biased to the ground level.

The anode 220 is made of a metal tube. The metal tube has an outer diameter and an inner diameter. For example, the inner diameter ranges from 250 µm to 2.0 mm. In another example, the inner diameter ranges from 0.5 mm to 2.0 mm. In yet another example, the inner diameter equals about 1 mm. The cathode 220 is connected to a voltage source. For example, the cathode 210 is biased to a voltage level ranging from 0 volts to 2000 volts. In other embodiments, the anode 220 is made of a screen, a ring, a point, and/or a substrate.

In one embodiment, the inner diameter of the anode 220 is larger than the inner diameter of the cathode 210. For example, the inner diameter of the anode 220 is at least twice as large as the inner diameter of the cathode 220. In another example, the inner diameter of the anode 220 is at least three times as large as the inner diameter of the cathode 220. In another embodiment, the anode 220 is shorter than the cathode 210. For example, this arrangement reduces particle loss to the walls of the metal tube for the anode 220.

As shown in FIGS. 2(A) and 2(B), the cathode 210 has an end 212, and the anode 220 has an end 222. The two ends 212 and 222 are separated by a gap 224. For example, the gap 224 has a length ranging from 0.5 to 2 mm. In another example, the length of the gap 224 is equal to about 1 mm. In yet another example, the length of the gap 224 can be adjusted using a micrometer. At least part of the cathode 210 and at least part of the anode 220 are pressure sealed in the sealing tube 230. For example, the sealing tube 230 is a Pyrex glass tube or a quartz tube.

The sealing tube 230 has an gas inlet 232. The gas inlet 232 can be placed at various locations. For example, as shown in FIG. 2(A), the gas inlet 232 is located next to the gap 212 instead of on either the anode side or the cathode side. In another example, as shown in FIG. 2(B), the gas inlet 232 is located on the anode side. Along the anode direction, the gas inlet 232 is away from the end 222 by a distance 234. For example, the distance 234 ranges from 2 to 4 mm.

The particle collector 260 is used to collect silicon nanoparticles. In one embodiment, the particle collector 260 includes liquid for collection. For example, dispersions of particles are obtained in solution by bubbling the aerosol stream through a glass frit into an organic solvent, which has been out-gassed for 1 to 2 hours to remove dissolved oxygen. In another example, 1-octanol is used as the organic solvent to stabilize silicon particles. After collecting particles for 24 hours, the solvent is removed by vacuum evaporation and the particles are re-dispersed in hexane. In another embodiment, the particle collector 260 includes a substrate used for collection. As an example, films of particles are deposited on a molybdenum substrate in stagnation flow downstream from the discharge.

The size classifier 270 includes a radial differential mobility analyzer (RDMA) which can detect charged particles. The RDMA is often preceded by a bipolar charger, such as a sealed $^{85}$Kr β-source, to ensure proper charging of the particles. The inventors of the instant application discovered that the bipolar charger enhances particle coagulation thus shifting the distribution to larger sizes. In one embodiment of the present invention, the bipolar charger is not used. Instead, the silicon nanoparticles are directed straight into the RDMA, which could then measure distributions of particles charged by a plasma. The electrometer 280 is coupled to the size classifier 270. For example, the electrometer 280 is Keithley Model 6514.

Figure 3:
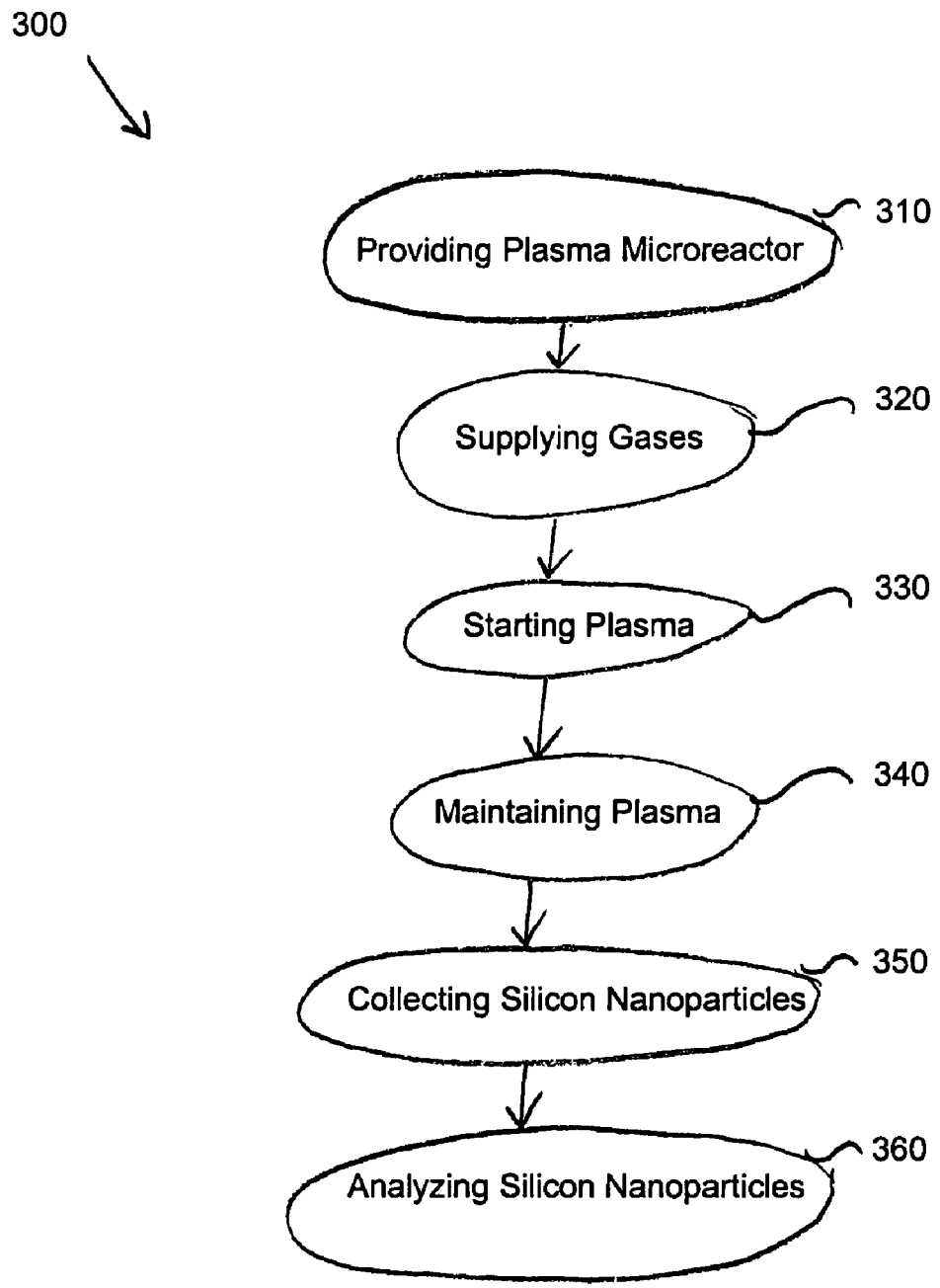
FIG. 3 is a simplified method for making silicon nanoparticles according to an embodiment of the present invention.

FIG. 3 is a simplified method for making silicon nanoparticles according to an embodiment of the present invention. This diagram is merely an example, which should not unduly limit the scope of the claims. One of ordinary skill in the art would recognize many variations, alternatives, and modifications. The method 300 includes a process 310 for providing plasma microreactor, a process 320 for supplying gases, a process 330 for starting plasma, a process 340 for maintaining plasma, a process 350 for collecting silicon nanoparticles, and a process 360 for analyzing silicon nanoparticles. Although the above has been shown using a selected sequence of processes, there can be many alternatives, modifications, and variations. For example, some of the processes may be expanded and/or combined. Other processes may be inserted to those noted above. Depending upon the embodiment, the specific sequence of processes may be interchanged with others replaced. For example, the process 360 is skipped. In another example, the method 300 is used to make nanoparticles other than silicon nanoparticles. In one embodiment, nanoparticles other than silicon nanoparticles are made, collected, and/or analyzed. Further details of these processes are found throughout the present specification and more particularly below.

At the process 310, a plasma microreactor is provided. For example, the plasma microreactor includes the system 200. At the process 320, certain gases are supplied to the plasma microreactor. For example, a gas mixture 322 flows through the cathode 210. The gas mixture 322 includes a gas precursor and an inert gas for diluting the gas precursor. In one embodiment, the gas precursor is silane, and the inert gas is argon. For example, the silane concentration within the gap 224 is controlled between 1 to 5 ppm by varying the flow rate of a 50-ppm $SiH_4$/Ar mixture while maintaining a constant total flow rate with a balance of argon.

Additionally, an inert gas 324 flows through the gas inlet 232 to regions outside of the cathode 210 within the system 200. In one embodiment, the inert gas 324 is argon. For example, an argon gas with 99.9995% purity is run through a copper getter gas purifier heated to 350° C. to completely remove oxygen before flowing into the plasma microreactor 200. In another embodiment, the gas 324 has a flow rate approximately three times larger than the gas mixture 322.

At the process 330, a plasma discharge is started. For example, the discharge exists in the hollow cathode 210 and extends towards the anode 220. In one embodiment, the discharge is formed by applying a voltage to the anode 220 while keeping the potential of the cathode 210 at the ground level. For example, the voltage ranges from 1000 to 2000 volts. In another embodiment, the discharge is formed by reducing the length of the gap 212, and applying a voltage to a voltage to the anode 220 while keeping the potential of the cathode 210 at the ground level. For example, the voltage is lower than 1000 volts. In another example, the plasma discharge is started at a pressure equal to or higher than one atmospheric pressure.

At the process 340, the plasma discharge is maintained. In one embodiment, the length of the gap 224 ranges from 0.5 to 2 mm. For example, the voltage for sustaining the discharge ranges from 300 to 500 volts. In another example, the current ranges from 3 to 10 mA. In another embodiment, the plasma discharge is maintained at a pressure equal to or higher than one atmospheric pressure. In yet another embodiment, the process 340 includes making nanoparticles. For example, silicon nanoparticles are formed within the plasma discharge. In another example, the silicon nanoparticles have a dimension, e.g., a diameter, less than 100 nm, or equal to or less than 5 nm, or equal to or less than 2 nm. In yet another example, the silicon nanoparticles have a quantum yield higher than 23%. In one embodiment, the quantum yield is equal to about 30%.

At the process 350, the silicon nanoparticles are collected. For example, the nanoparticles are collected in liquid and/or on a substrate. In another example, the silicon nanoparticles are collected by the particle collector 260.

As discussed above, at the processes 330 and 340, the plasma discharge is started and maintained. For example, the discharge exists in the hollow cathode 210 and extends towards the anode 220. In one embodiment, the plasma density is higher in part of the hollow cathode 210 than in the gap 224. In another embodiment, silicon nanoparticles are mostly synthesized in the hollow cathode 210. At the gap 224, the inert gas 324 starts quenching the nanoparticles, and the quenching continues in the hollow anode 220. As an example, the quenching can terminate the growth of the silicon nanoparticles. In another example, the quenching can reduce or prevent particle agglomeration by gas dilution.

At the process 360, the silicon nanoparticles are analyzed. For example, the process 360 is performed before and/or after the process 350. In one embodiment, the sizes of the silicon nanoparticles are measured by the size classifier 270 and the electrometer 280.

As discussed above and further emphasized here, the method 300 can be used to make nanoparticles with the system 200 according to one embodiment of the present invention. For example, silicon nanoparticles are synthesized with the gas 322 including silane. In another example, metal nanoparticles are synthesized with the gas 322 including metal carbonyls. In one embodiment, nickel nanoparticles are made with the gas 322 including $Ni(CO)_6$. In another embodiment, metal nanoparticles are iron, cobalt, and/or nickel nanoparticles. In yet another embodiment, iron nanoparticles are made with the gas 322 including ferrocene $(Fe(C_5H_5)_2)$. In yet another example, germanium nanoparticles are made with the gas including Germane $(GeH_4)$.

In yet another embodiment, multiple systems 200 are used in parallel to make nanoparticles according to the method 300. In another embodiment, the system 200 produces a direct-current (dc), atmospheric-pressure microdischarge for particle synthesis. In yet another embodiment, the system 200 uses the inert gas 324 to reduce coagulation of the nanoparticles downstream of the plasma reaction zone.

In one embodiment, as shown in FIG. 2(B), the inert gas 324 flows through the gas inlet 232. In one embodiment, the gas inlet 232 is located on the anode side instead of on the cathode side. The inventors of the present invention have discovered that such arrangement provides certain advantages over placing the gas inlet 232 next to the gap 224 or on the cathode side. For example, placing the gas inlet 232 on the cathode side can lower the temperature of the cathode and thus produce undesirable effects. In another example, placing the gas inlet 232 on the anode side can improve uniformity of the gas 324 flowing into the anode.

According to another embodiment, an inert gas 324 flows through the gas inlet 232 to regions outside of the cathode 210 within the system 200. In one embodiment, the inert gas 324 is argon. For example, an argon gas with 99.9995% purity is run through a copper getter gas purifier heated to 350° c. to completely remove oxygen before flowing into the plasma microreactor 200. In another embodiment, the gas 324 has a flow rate approximately three times larger than the gas mixture 322.

According to yet another embodiment, silicon nanoparticles are made with the system 200 according to the method 300. For example, the gas mixture 322 includes silane and argon. The synthesized nanoparticles can be either positive charged or negative charged. For both charge polarities, the silicon nanoparticles are characterized by the size classifier 270 and the electrometer 280. For example, the size classifier 270 includes a radial differential mobility analyzer (RDMA).

As discussed above and further emphasized here, FIGS. 2(A), 2(B), and 3 are merely examples, which should not unduly limit the scope of the claims. One of ordinary skill in the art would recognize many variations, alternatives, and modifications. For example, in the system 200, the sealing tube 230 does not include the gas inlet 232. In another example, in the method 300, at the process 320, the gas 324 is not provided.

Figure 4:
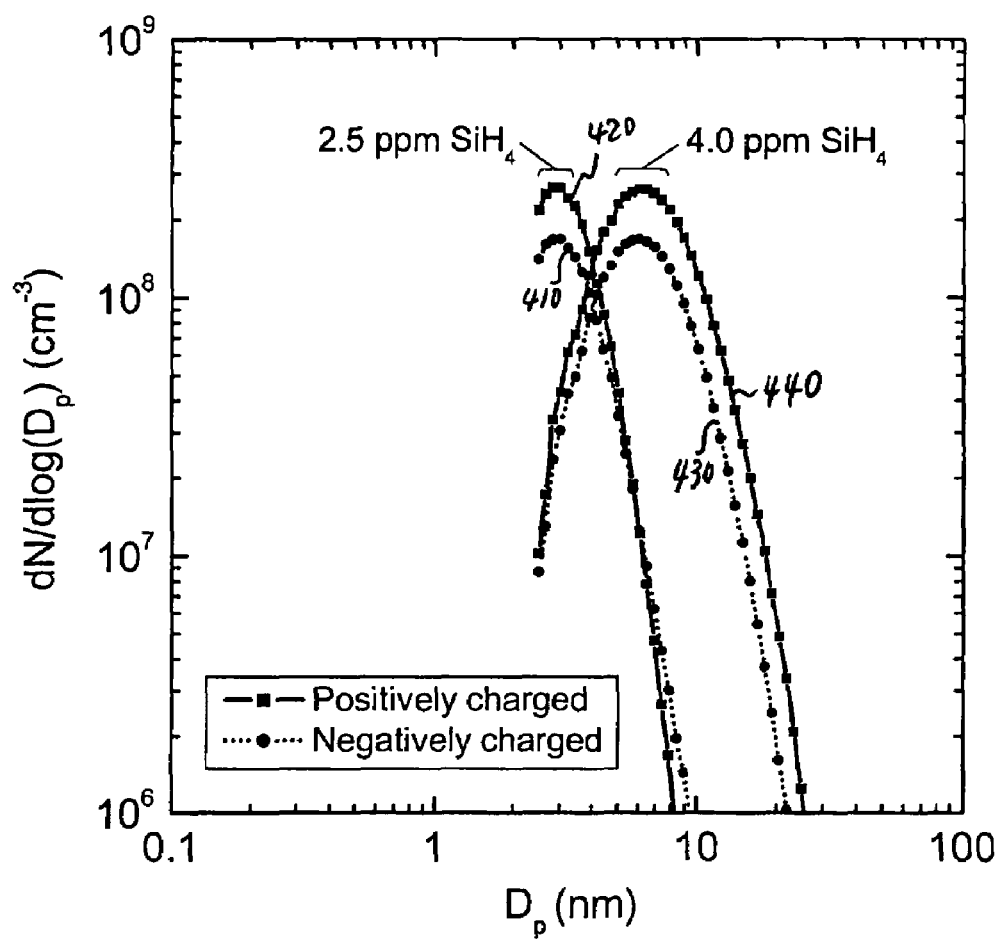
FIG. 4 shows simplified size distributions of silicon nanoparticles as classified by RDMA for two silane concentrations according to an embodiment of the present invention.

FIG. 4 shows simplified size distributions of silicon nanoparticles as classified by RDMA for two silane concentrations according to an embodiment of the present invention. This diagram is merely an example, which should not unduly limit the scope of the claims. One of ordinary skill in the art would recognize many variations, alternatives, and modifications. The silicon nanoparticles are synthesized by the method 300 with the system 200. For example, the total flow rate of the gas 322 is about 150 sccm, and the argon quench gas 324 has a flow rate of about 450 sccm. The electrode gap 224 is about 1-mm long, and the discharge current is about 6 mA. As shown in FIG. 4, curves 410 and 430 each correspond to negatively charged particles, and curves 420 and 440 each correspond to positively charged particles. Additionally, the curves 410 and 420 each correspond to a silane concentration of 2.5 ppm, and the curves 430 and 440 each correspond to a silane concentration of 4.0 ppm.

For the RDMA, the particle size measurement is based on their electrical mobility in a carrier gas and thus, corresponds to the projected area of the aerosol nanoparticles. In the range of silane concentrations explored here, the discharge is stable and the particle size distributions are reproducible. Below a silane concentration of 1 ppm, particles can not be detected. For example, the particles are smaller than the 2.5 nm detection limit of the RDMA. As the silane concentration is raised from 2.5 to 4.0 ppm, the mean particle size increases and the size distribution broadens significantly. Fitting to a log-normal distribution has provided estimates of the geometric mean diameter ($D_g$) and standard deviation ($\sigma_g$). At a silane concentration of 2.5 ppm, $D_g$ and $\sigma_g$ have been found to be 2.9 nm and 1.32, respectively. The observed $\sigma_g$ compares favorably with values measured by other growth processes without size-selection. Increasing the silane concentration to 4.0 ppm increases $D_g$ and $\sigma_g$ to 6.2 nm and 1.45, respectively. The observed dependencies and the overall shape of the size distributions are consistent with particle growth by coagulation. As shown in FIG. 4, more positively-charged particles are detected. This is consistent with silicon cluster nucleation in low-pressure discharges where photo-detachment studies have found very little negative charge on crystallites smaller than 2 nm. Remarkably, the peak number density for each charge polarity does not change appreciably with silane concentration. The latter observation suggests that the particle density exceeds that of ions and electrons in the discharge available for attachment, thus most of the particles should be at most singly charged. Large particles such as ones larger than 10 nm charge up negatively in a plasma as a result of the larger electron mobility. Thus, observation of both charge polarities corroborates the existence of very small particles.

Figure 5:
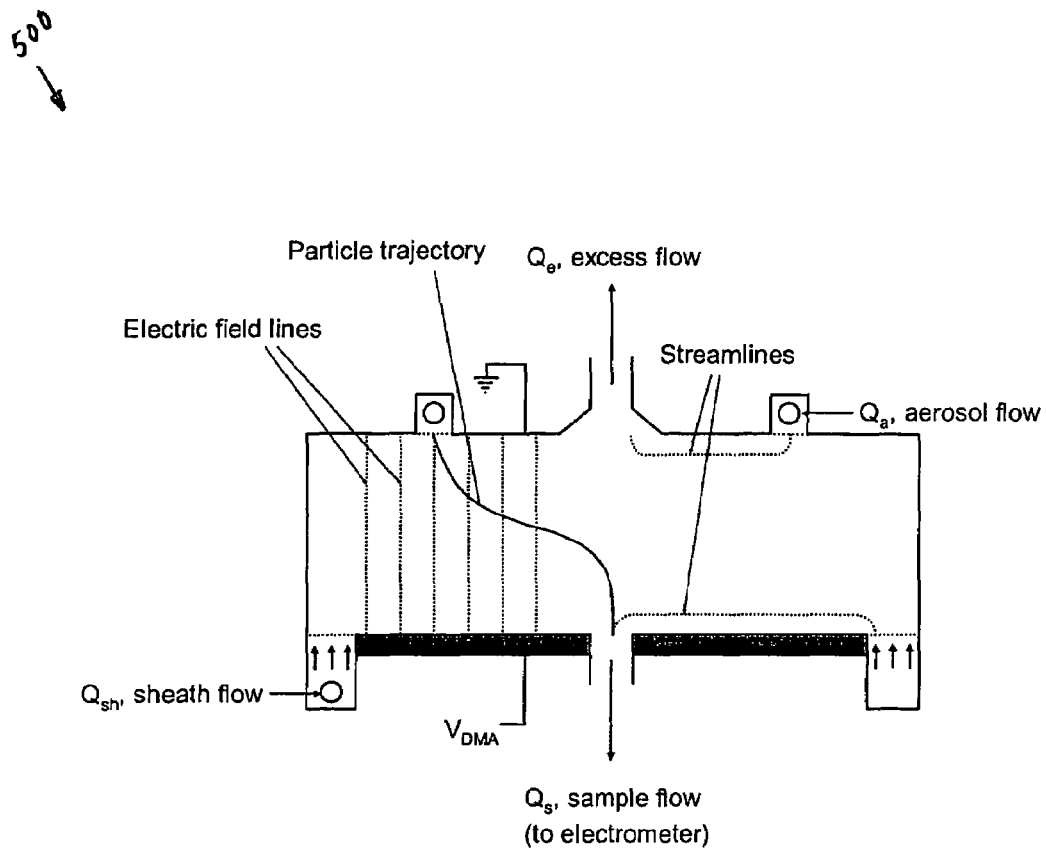
FIG. 5 is a simplified RDMA used as the size classifier 270 according to an embodiment of the present invention.

In another embodiment, vapor-phase synthesis of nanoparticles enables coupling of the reactor setup with aerosol instrumentation that measures the size and distribution of particles in situ. For example, size-classification is performed using a radial differential mobility analyzer (RDMA). FIG. 5 is a simplified RDMA used as the size classifier 270 according to an embodiment of the present invention. This diagram is merely an example, which should not unduly limit the scope of the claims. One of ordinary skill in the art would recognize many variations, alternatives, and modifications.

As shown in FIG. 5, an RDMA 500 includes a capacitor in which charged aerosol particles migrate in an electric field across a laminar flow of sheath gas. The aerosol stream enters the RDMA 500 at a position on the outer radius and flows inward towards the center where the classified aerosol is collected. The particle size measurement is based on their electrical mobility in the carrier gas and thus, corresponds to the projected area of the aerosol particles. For a given voltage, particles within a narrow range of mobilities transverse the gap between the electrodes and are extracted by a sampling orifice opposite to the aerosol inlet. Particles with higher mobilities deposit on the bottom electrode. Particles with too low mobility are carried out with the excess sheath gas flow. By varying the voltage, particles of different mobilities are transmitted through the instrument. The concentration of classified nanoparticles is measured by flowing the aerosol into the electrometer 280. Combined operation of the RDMA 500 used as the size classifier 270 and the electrometer 280 allows determination of the nanoparticle size distribution. As shown in FIG. 5, values for $Q_a$, $Q_{sh}$, $Q_s$, and $Q_e$ are, for example, equal to 600 sccm, 5.5 slm, 600 sccm, and 5.5 slm, respectively.

Figure 6:
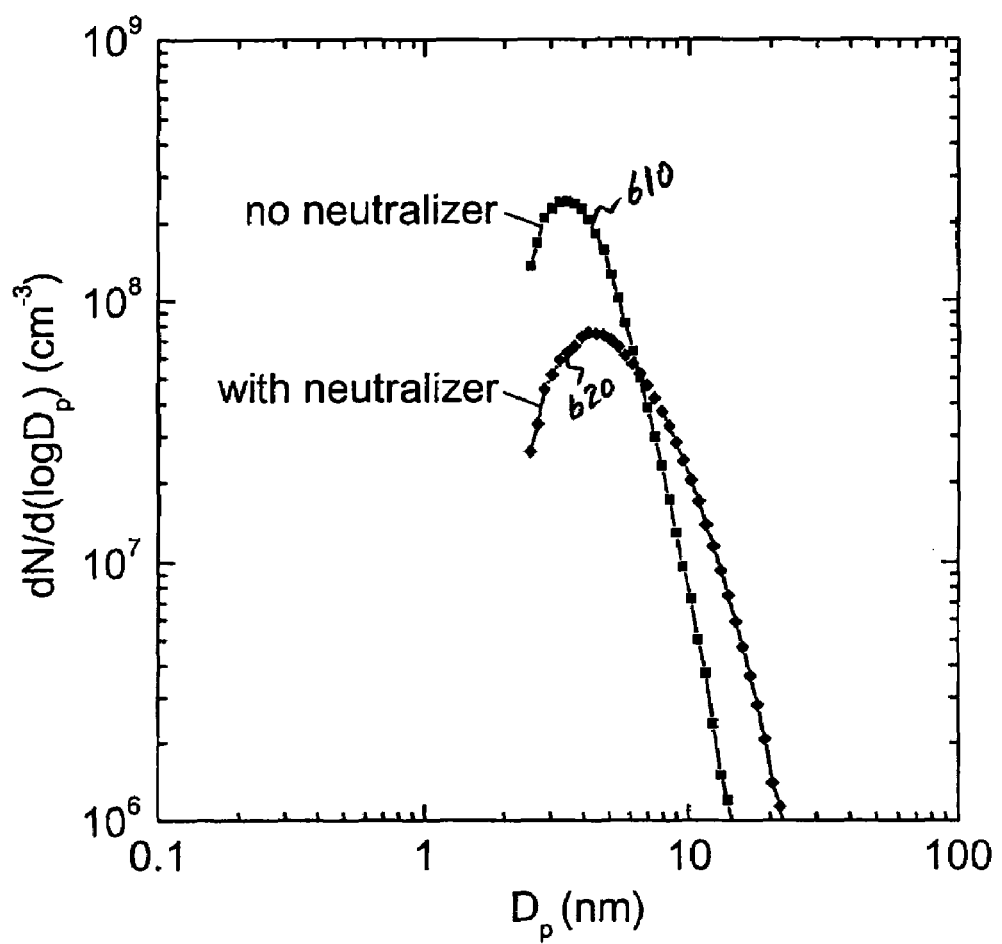
FIG. 6 shows simplified sizes of silicon nanoparticles with and without a neutralizer in-line according to an embodiment of the present invention.

To impart a known charge distribution on particles, the aerosol is normally passed through a bipolar charger (sealed 85Kr-β source), commonly referred to as a "neutralizer," before entering the RDMA. For particles in the size range explored here, the neutralizer has been found to cause growth by agglomeration. FIG. 6 shows simplified sizes of silicon nanoparticles with and without a neutralizer in-line according to an embodiment of the present invention. This diagram is merely an example, which should not unduly limit the scope of the claims. One of ordinary skill in the art would recognize many variations, alternatives, and modifications. The silicon nanoparticles are synthesized by the method 300 with the system 200. A curve 610 corresponds a size distribution without a neutralizer, and a curve 620 corresponds to a size distribution with a neutralizer. When a neutralizer is used, the measured size distribution appeared broad with an extended tail indicating a coagulated aerosol. A narrower size distribution with a smaller mean diameter is obtained by removing the neutralizer and collecting plasma-charged particles directly. The residence time for particle growth in the plasma discharge is estimated to be on the order of 1 millisecond according to an embodiment of the present invention. At an aerosol flow rate of 600 sccm, the neutralizer increases the residence time to 10 seconds, artificially causing broadening. Shortening the residence time of particles between the reactor and size classifier should provide a more accurate representation of the distribution of particles synthesized in our process.

Figure 7:
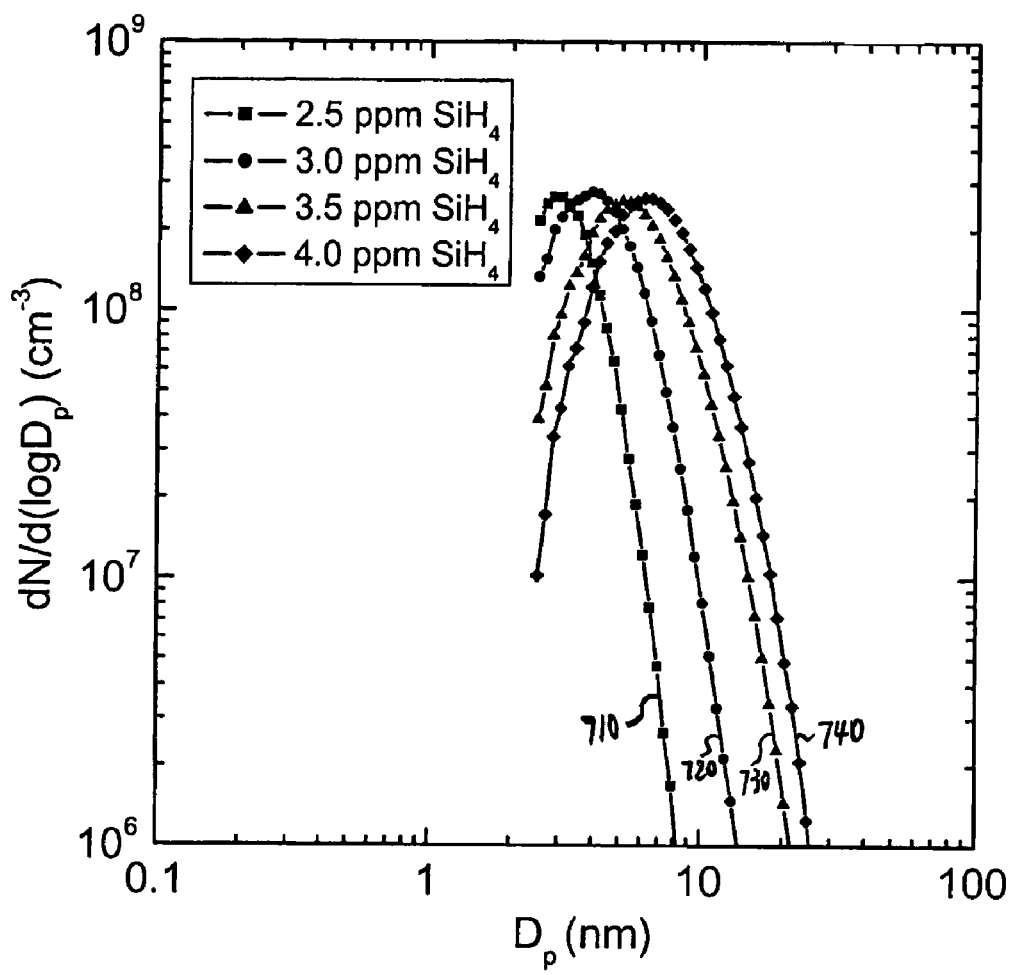
FIG. 7 shows simplified size distributions of silicon nanoparticles without neutralizer according to an embodiment of the present invention.

FIG. 7 shows simplified size distributions of silicon nanoparticles without neutralizer according to an embodiment of the present invention. This diagram is merely an example, which should not unduly limit the scope of the claims. One of ordinary skill in the art would recognize many variations, alternatives, and modifications. The silicon nanoparticles are synthesized by the method 300 with the system 200. For example, the flow rate for the gas 322 is about 150 sccm, and the flow rate for the argon gas 324 is about 450 sccm. The length of the gap 224 is about 1 mm, and the discharge current is about 6 mA at the process 340. For silicon nanoparticles, the flux ranges from $3.1 \times 10^7$ to $5.8 \times 10^7$/ml, which amounts about 1 μg/hour with about 600 ml/min. Curves 710, 720, 730, and 740 represent size distributions that correspond to silane concentrations of 2.5, 3.0, 3.5, and 4.0 ppm, respectively. These size distributions have been measured without charge neutralizer.

The orientation of the electric field in the RDMA for these experiments is such that positively charged particles are transmitted. In the range of silane concentrations explored here, the discharge is stable with highly reproducible size distributions. Below a silane concentration of 1 ppm, particles cannot be detected. For example, the particles are smaller than the 2.5 nm detection limit of the RDMA. As the silane concentration is raised from 2.5 to 4.0 ppm, the mean particle size increases and the size distribution broadens significantly. Fitting to the following log-normal distribution provides estimates of the geometrical mean diameter ($D_g$) and geometrical standard deviation ($\sigma_g$):

$$\frac{dN}{d \ln D_p} = \frac{N}{(2\pi)^{1/2} \ln \sigma_g} \exp\left(-\frac{(\ln D_p - \ln D_g)^2}{2 \ln^2 \sigma_g}\right) \quad \text{(Equation 1)}$$

where N is the total aerosol number concentration, and $D_p$ is the mean diameter. Regression to the log-normal distribution has been performed with $D_g$ and $\sigma_g$ as the fitting parameters.

Figure 8:
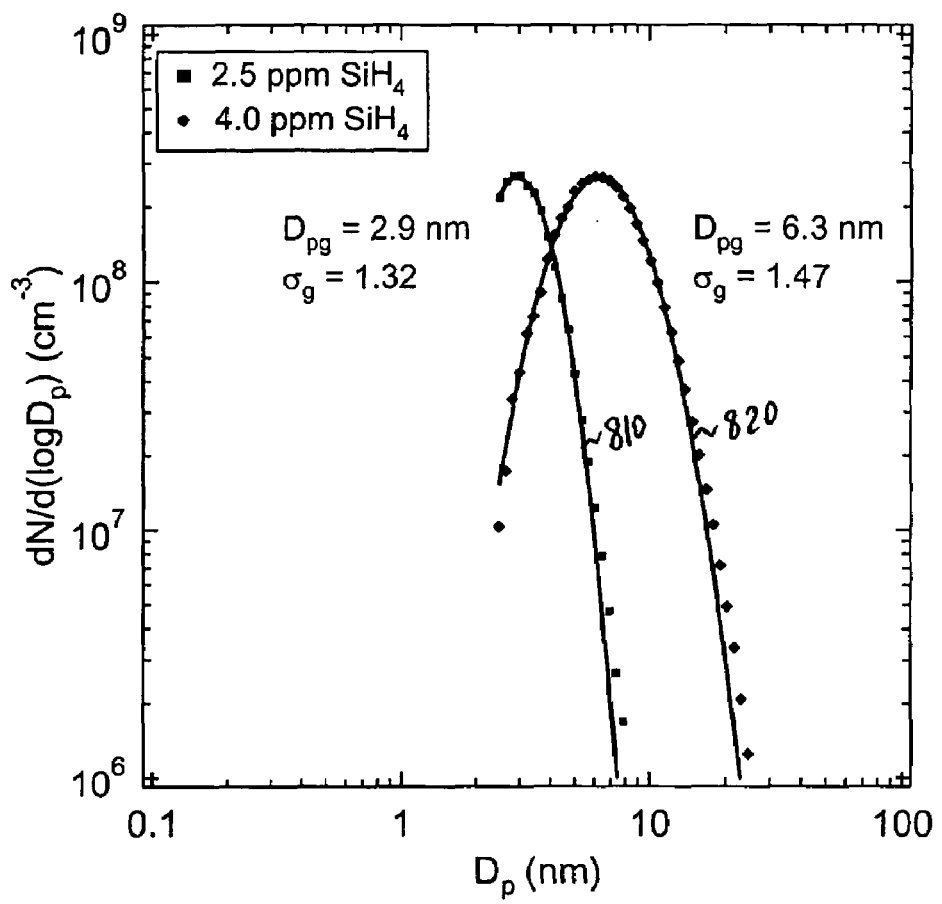
FIG. 8 shows simplified size distributions fitted with $D_g$ and $\sigma_g$ according to an embodiment of the present invention.

FIG. 8 shows simplified size distributions fitted with $D_g$ and $\sigma_g$ according to an embodiment of the present invention.

This diagram is merely an example, which should not unduly limit the scope of the claims. One of ordinary skill in the art would recognize many variations, alternatives, and modifications. A curve 810 represents a size distribution for a silane concentration of 2.5 ppm, and a curve 820 represents a size distribution for a silane concentration of 4.0 sccm. Both curves are closely approximated by the log-normal fit, but exhibit a tail at larger diameters. At a silane concentration of 2.5 ppm, $D_g$ and $\sigma_g$ have been found to be 2.9 nm and 1.32, respectively. The observed $\sigma_g$ compares favorably with values measured by other growth processes without size-selection which were reported to be 1.5-1.6. Increasing the silane concentration to 4.0 ppm increases $D_g$ and $\sigma_g$ to 6.2 nm and 1.45, respectively. The increasing value of $\sigma_g$ at higher silane concentrations may indicate the onset of particle growth by agglomeration.

Charged particles of both polarities can be measured by alternating the orientation of the electric field in the RDMA used as the size classifier 270. As discussed above, FIG. 4 shows simplified size distributions of silicon nanoparticles as classified by RDMA for two silane concentrations according to an embodiment of the present invention. The presence of positively and negatively charged particles is not surprising since particles can acquire charge in a plasma from ions and electrons. Most objects placed in a plasma charge negatively as a result of the higher mobility of electrons. The mobility of charge carriers in a plasma is given by:

$$\mu = \frac{|q|}{mv_m} \quad \text{(Equation 2)}$$

where $\mu$ is the mobility constant, q is the charge, m is the mass, and $v_m$ is the momentum transfer frequency. It is the large mass difference between ions and electrons that often leads to a difference in mobility. Charging of small particles, less than 3 nm in diameter, is complicated, however, by statistical fluctuations. Note that in our case more positively charged particles are detected at both the low and high silane concentration as shown in FIG. 4. This is consistent with silicon cluster nucleation in low-pressure discharges where photo-detachment studies found very little negative charge on crystallites smaller than 2 nm. Large particles, such as ones equal to 10 nm, charge up negatively in a plasma as a result of the larger electron mobility. Thus, observation of both charge polarities corroborates the existence of very small particles. Remarkably, the peak number density for each charge polarity does not change appreciably with silane concentration. This suggests that the particle density exceeds that of ions and electrons in the discharge available for attachment and most of the particles should be at most singly charged. Particles in this size range are not likely to carry multiple charges.

Figure 9:
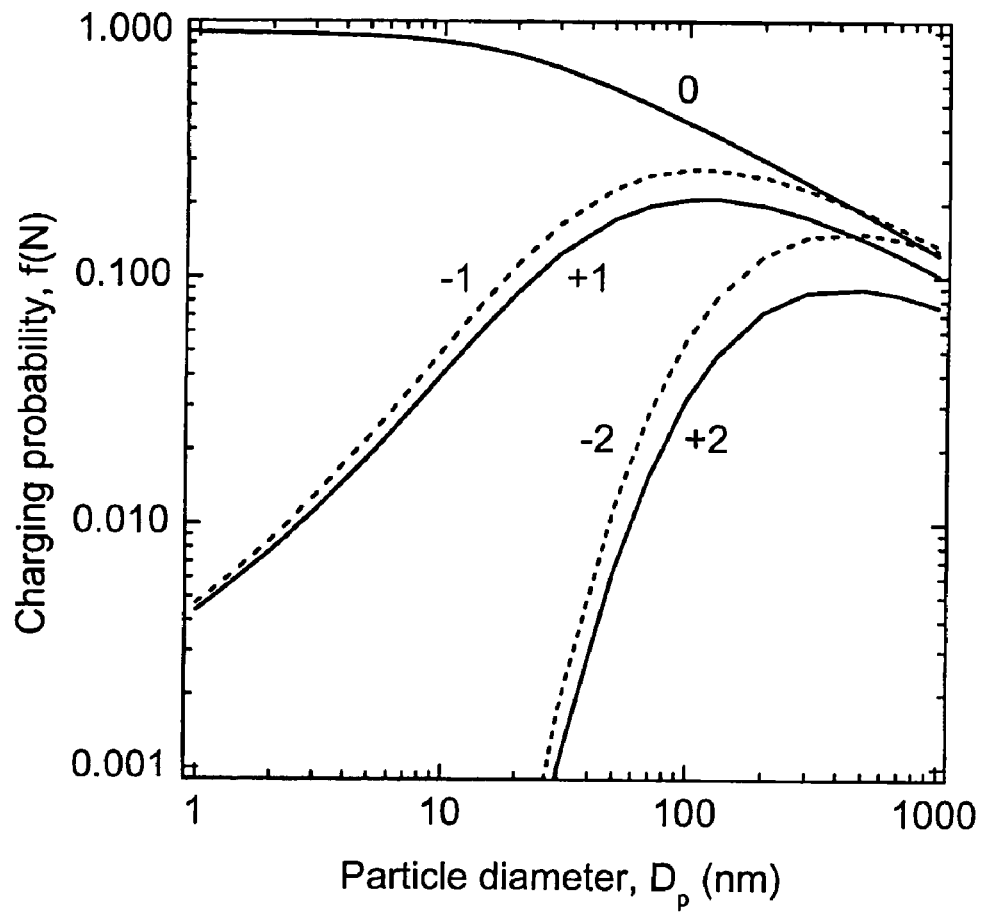
FIG. 9 shows simplified charging probabilities for silicon nanoparticles passing through a neutralizer according to an embodiment of the present invention.

FIG. 9 shows simplified charging probabilities for silicon nanoparticles passing through a neutralizer according to an embodiment of the present invention. This diagram is merely an example, which should not unduly limit the scope of the claims. One of ordinary skill in the art would recognize many variations, alternatives, and modifications. The silicon nanoparticles are synthesized by the method 300 with the system 200. At the neutralizer, negative and positive ions are responsible for charging. For example, the neutralizer includes a bipolar charger ($^{85}$Kr β). The results are obtained by approximating an empirical expression of the Fuchs model. It is apparent that particles less than 10 nm in diameter have a very low probability of acquiring more than a single charge, supporting our observations. Since the RDMA measures particle mobility which is a function of size and charge, the existence of only singly charged particles signifies that the distributions are reflective of the particle size.

Size measurements by other techniques have also been attempted according to another embodiment of the present invention. TEM imaging of silicon particles deposited on carbon grids reveals particle assemblies of sizes larger than those measured by the RDMA suggesting particle agglomeration during the deposition process. Atomic force microscopy (AFM) has also been used on np-Si samples suspended in hexane after dispersion on a silicon wafer and solvent evaporation. The mean particle height is 1.6 nm while particles as small as 1.0 nm and as large as 6.6 nm has been measured. Observation by transmission electron microscopy (TEM) has been inconclusive as to the crystalline nature of the particles. The particles may have been oxidized during air transfer to the microscope reducing the core size to below the resolution limit of the TEM.

According to another embodiment of the present invention, silicon nanoparticles are collected either on a substrate or in liquid without size-selection for characterization by transmission electron microscopy (TEM), atomic force microscopy (AFM), micro-Raman spectroscopy, and energy dispersive X-ray spectroscopy (EDS). For example, particles are deposited onto carbon-coated copper TEM grids by flowing the aerosol stream into an electrostatic precipitator. Films of particles are obtained by placing a molybdenum substrate in the system 200 in a stagnation flow geometry with the plasma discharge. Dispersions of particles in a solution phase can be obtained by bubbling the aerosol stream through a glass frit into a solvent that has been outgassed for 1 to 2 hours. For example, 1-octanol has been used for its low volatility and since it has been shown to stabilize silicon particles. After collecting silicon nanoparticles for about 24 hours, the solvent is removed by vacuum evaporation and the particles are redispersed in hexane.

Figure 10:
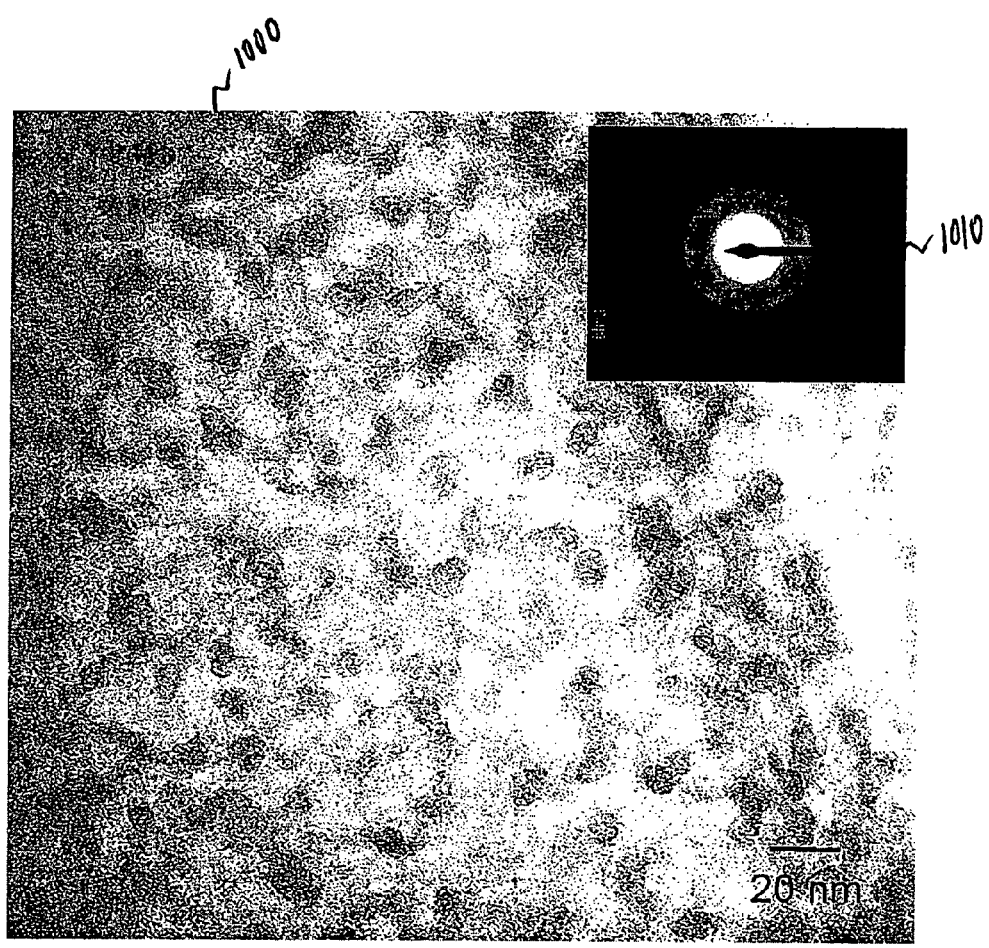
FIG. 10 is a simplified bright-field TEM image of silicon nanoparticles according to an embodiment of the present invention.

FIG. 10 is a simplified bright-field TEM image of silicon nanoparticles according to an embodiment of the present invention. This diagram is merely an example, which should not unduly limit the scope of the claims. One of ordinary skill in the art would recognize many variations, alternatives, and modifications. The silicon nanoparticles are synthesized and deposited by the method 300 with the system 200. The image 1000 shows the presence of large aggregates more than 10 nm in size. Since structures of this size have not been observed in the RDMA, agglomeration may have occurred during the deposition process. The aggregates appear to be made up of smaller spherical particles approximately 5 nm in diameter. These primary particles appear to be uniform in size, consistent with the narrow size distributions obtained using the RDMA. The image 1010 for electron diffraction is characteristic of an amorphous material. Since the samples have been exposed to air during loading into the TEM, oxidation of the particles may have occurred, preventing the preservation of the crystalline core. It has been reported that for particles in this size limit, such as less than 4 nm, crystal structure is difficult to observe because the surface energy is higher than the lattice energy. The formation of a silicon oxide shell could also be responsible for the larger particle sizes observed by TEM.

Figure 11:
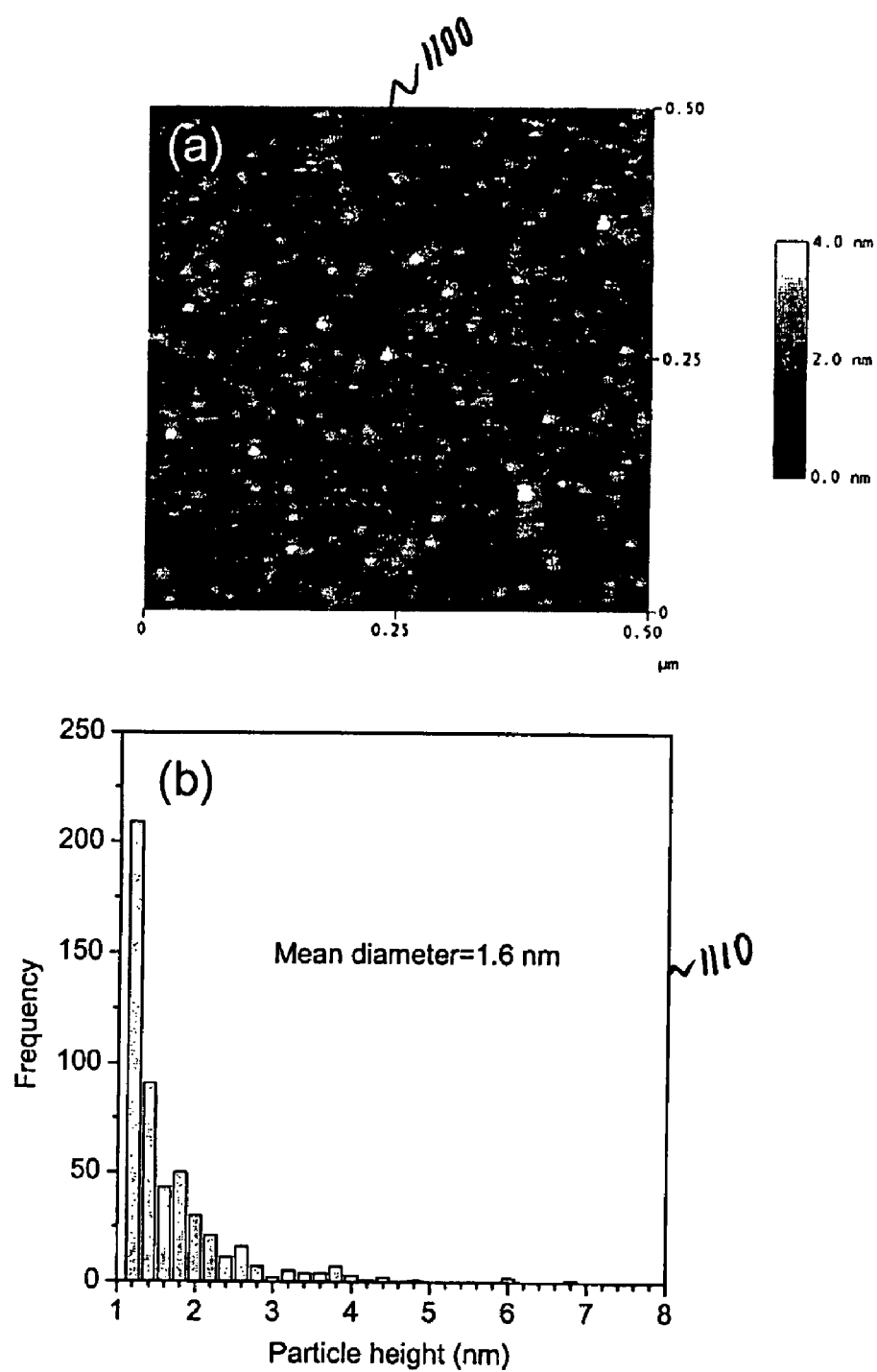
FIGS. 11 and 12 show simplified nanoparticle characteristics obtained by SEM according to an embodiment of the present invention.
Figure 12:
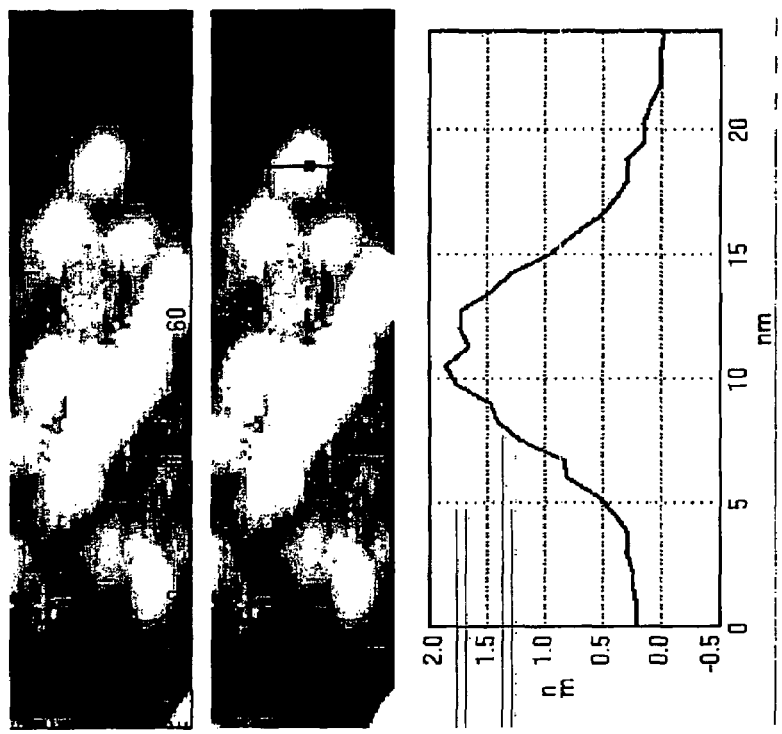
Figure 12:
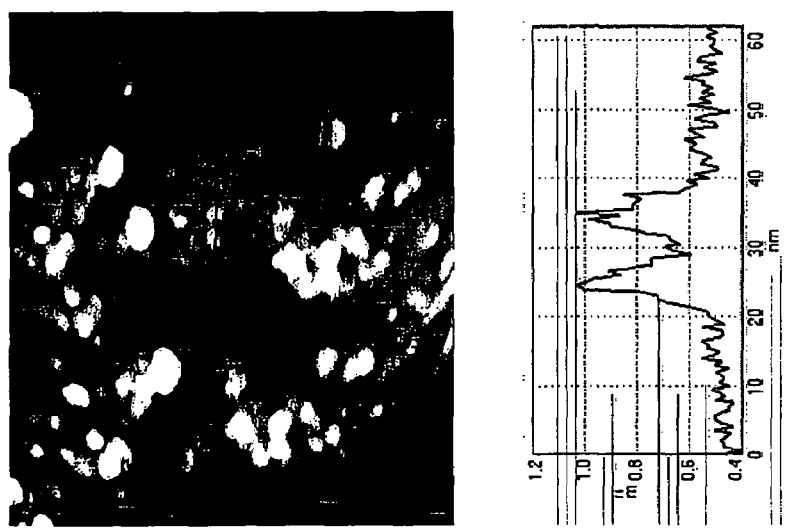

FIGS. 11 and 12 show simplified nanoparticle characteristics obtained by SEM according to an embodiment of the present invention. This diagram is merely an example, which should not unduly limit the scope of the claims. One of ordinary skill in the art would recognize many variations, alternatives, and modifications. AFM is used to determine the size of silicon nanoparticles in hexane solution by evaporating a drop of the dispersion on a crystalline silicon wafer. Diluting the dispersion appropriately allows particles to be well isolated as shown in an AFM image 1100 of FIG. 11. The particles have been sized by measuring the height of approximately 500 particles. From a histogram 1110 as shown in FIG. 11, the mean particle height is calculated to be 1.6 nm. Particles as small as 1.0 nm and as large as 6.6 nm have also been observed. Additionally, FIG. 12 shows that unagglomerated particles appear to be less than 2 nm in size.

Figure 13:
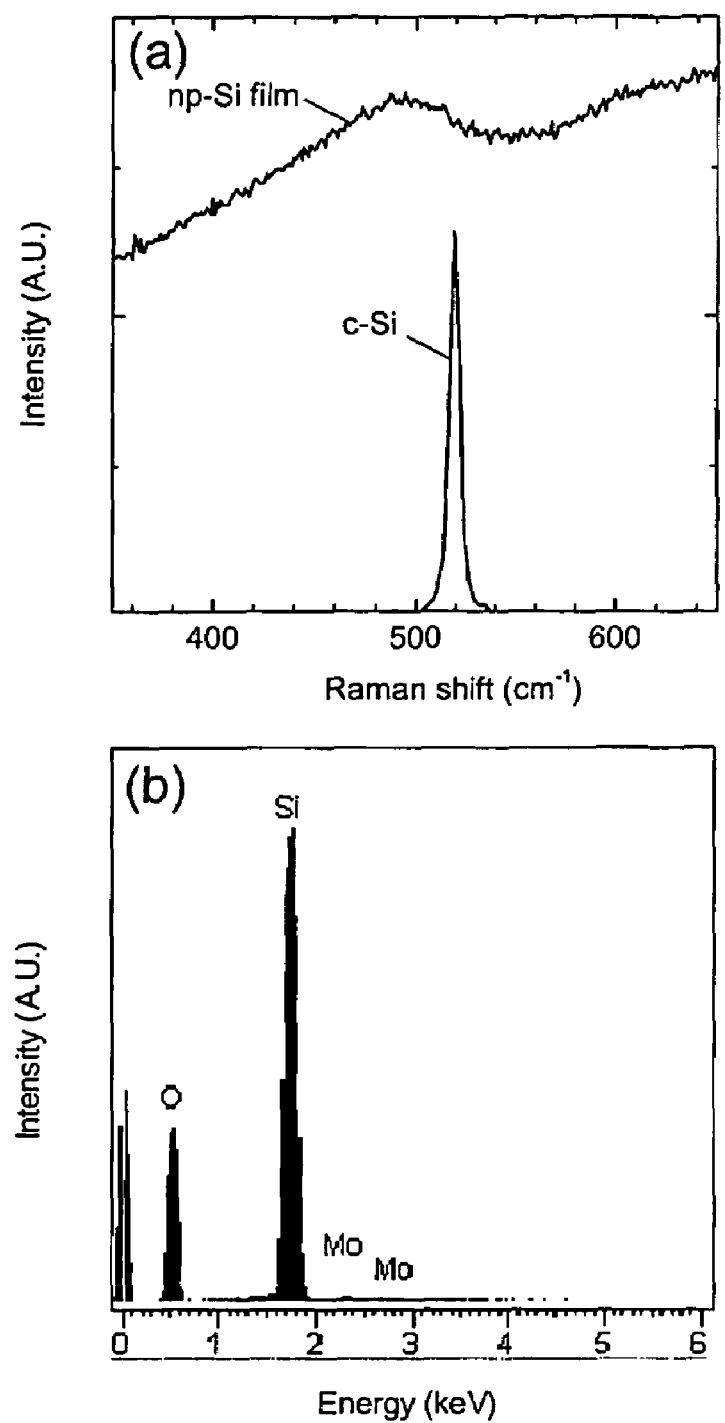
FIG. 13 is a simplified micro-Raman spectrum for silicon nanoparticles according to an embodiment of the present invention.

FIG. 13 is a simplified micro-Raman spectrum for silicon nanoparticles according to an embodiment of the present invention. This diagram is merely an example, which should not unduly limit the scope of the claims. One of ordinary skill in the art would recognize many variations, alternatives, and modifications. The silicon nanoparticles are synthesized by the method 300 with the system 200. For example, these nanoparticles are deposited on molybedenum for about 1 hour to form a silicon nanoparticle film. The peak corresponds to the sum of two Gaussian peaks at 477 cm$^{-1}$ and 507 cm$^{-1}$ attributed to amorphous silicon, a-Si:H, and grain boundaries in nanocrystalline silicon films, respectively. This spectrum has been compared to that of a crystalline silicon substrate which shows a single sharp peak at 519 cm$^1$. The broad shape of the peak as well as the shift from crystalline silicon confirms that deposited films are amorphous and made up of nanoparticles. For example, analysis by EDS has confirmed that the films consist of only silicon and oxygen, as shown in FIG. 12. Peaks from the molybdenum substrate are also evident but no other contaminants have been detected.

Figure 14:
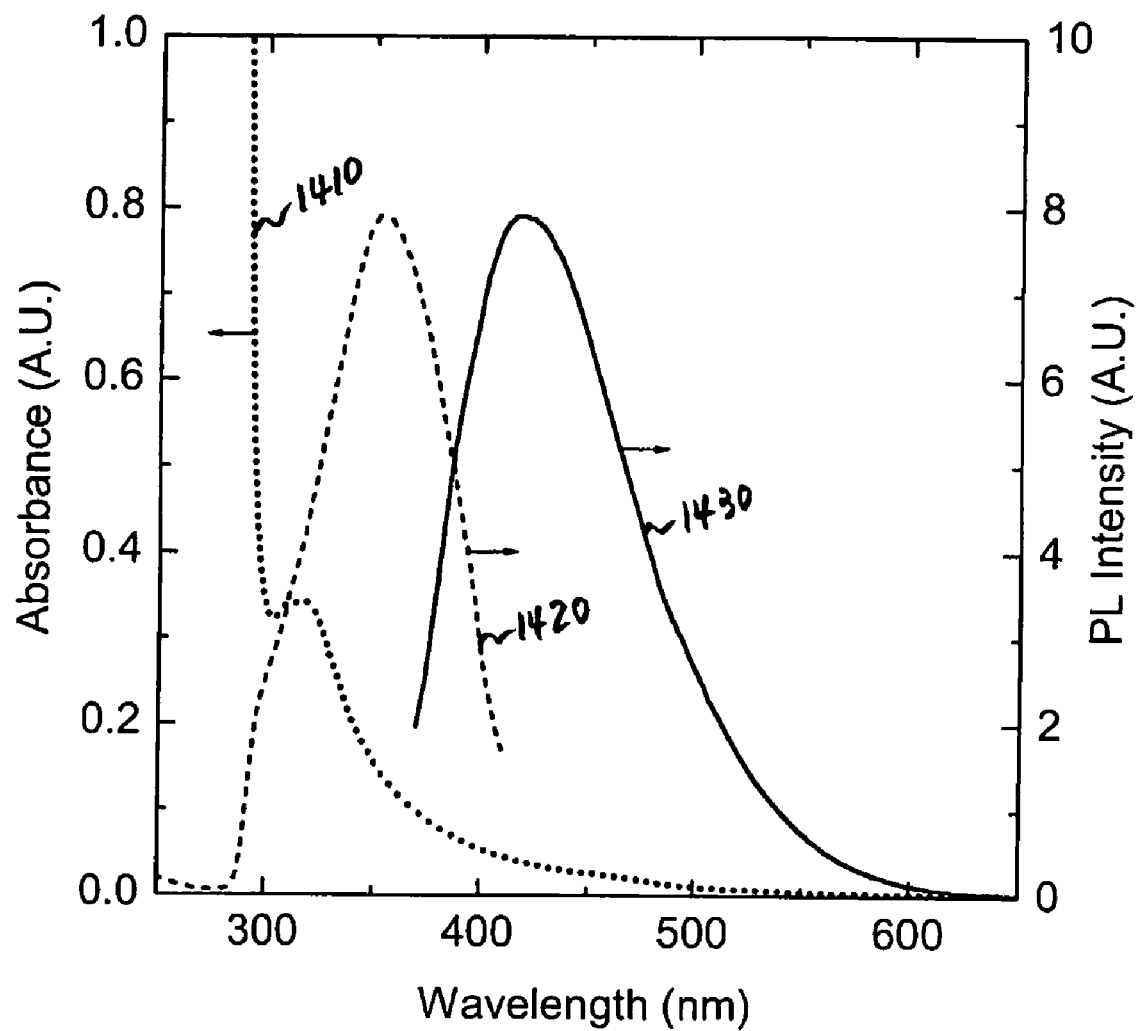
FIG. 14 shows simplified PL spectra from suspended silicon nanoparticles according to an embodiment of the present invention.

According to an embodiment of the present invention, PL measurements have been performed at room temperature on both suspended and deposited np-Si samples. For hexane-suspended np-Si, excitation and emission spectra have been obtained using a spectrophotometer. For example, the spectrophotometer is Model QM by Photon Technology International. FIG. 14 shows simplified PL spectra from suspended silicon nanoparticles according to an embodiment of the present invention. This diagram is merely an example, which should not unduly limit the scope of the claims. One of ordinary skill in the art would recognize many variations, alternatives, and modifications. The silicon nanoparticles are synthesized by the method 300 with the system 200. For example, the flow rate of silane is about 2.5 ppm. A curve 1410 represents a room-temperature absorbance spectrum, a curve 1420 represents a PL excitation spectrum collected by fixing the detection at 420 nm, and a curve 1430 represents a PL emission spectra with fixed excitation wavelength at 360 nm. These curves have been taken for silicon nanoparticles in hexane solution. As shown in FIG. 14, the spectra 1420 and 1430 exhibit an excitation peak at 360 nm and an emission maximum at 420 nm. The strong blue emission is readily observable by naked eye. The band gap for silicon nanoparticles, for example, equals about 2.9 eV. In the absorbance spectrum 1410, there is a characteristic yellow absorption tail from 370 nm across the visible that has been observed for np-Si colloids.

As discussed above, FIG. 14 shows the UV-visible absorbance spectrum as the curve 1410. The yellow absorption tail corresponds to the indirect gap of bulk Si. Some of the features in the spectrum, including the peak at approximately 320 nm, have also been reported for 2.0 nm Si colloids and attributed to a higher energy, direct transition.

It is apparent that the absorption edge and excitation peak are at similar energies, while the emission peak is red-shifted. In general, the absorption gap in np-Si has been found to be larger than the emission gap. When light is absorbed, the particle undergoes an electronic excitation in which an electron-hole pair (exciton) is formed. Recombination of the electron and hole by emission of a photon occurs at a lower energy because of structural relaxation processes in the particle. The difference between the absorption and emission energy is known as the Stokes shift:

$$E^{Stokes} = E^{absorption} - E^{emission} \qquad \text{(Equation 3)}$$

where $E^{absorption}$ is the energy required to excite the cluster from its ground state to the lowest excited state, $E^{emission}$ is the energy released during recombination, and $E^{Stokes}$ is the Stokes shift. From FIG. 14, the $E^{absorption}$, $E^{emission}$, and $E^{Stokes}$ for np-Si are approximately 3.4 eV, 2.9 eV, and 0.5 eV, respectively. The shift of the optical gap from the bulk value for Si of 1.12 eV represents the effect of quantum confinement.

Assuming that the PL emission at 420 nm or 2.95 eV is excitonic, the silicon particle core size can be estimated from calculations to be less than 2 nm. This size is closer to the AFM result but significantly smaller than the RDMA measurement. The size discrepancy could be related to smaller particle agglomeration in the aerosol measurements or larger particle oxidation upon exposure to ambient air. Particles grown at higher silane concentrations, which appear to be bigger according to the RDMA, do not exhibit red-shifted PL peaks as expected from quantum confinement. Hence the short residence time in the microreactor may have limited the primary particle size in the 1-2 nm range. Larger silane concentrations result in the production of more particles in the same size range.

Figure 15:
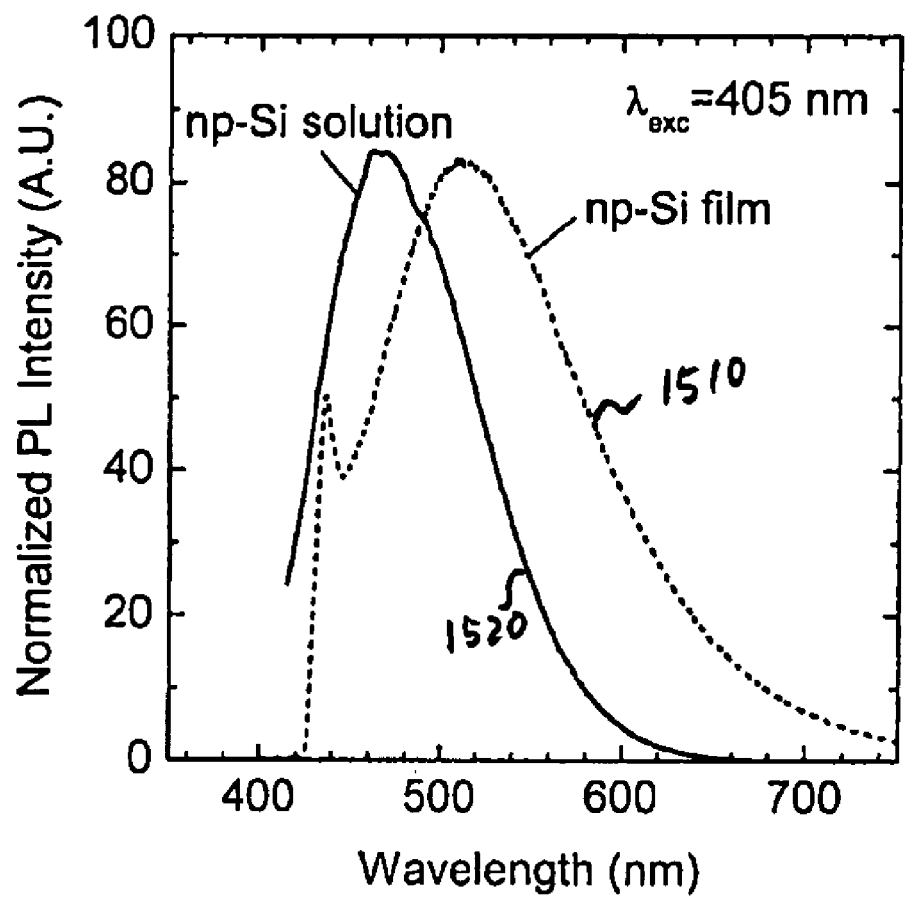
FIG. 15 shows a simplified comparison of PL spectra according to another embodiment of the present invention.

FIG. 15 shows a simplified comparison of PL spectra according to another embodiment of the present invention. This diagram is merely an example, which should not unduly limit the scope of the claims. One of ordinary skill in the art would recognize many variations, alternatives, and modifications. The silicon nanoparticles are synthesized by the method 300 with the system 200. A curve 1510 represents a spectrum corresponding to a np-Si thin film, and a curve 1520 represents a spectrum corresponding to np-Si solution. For example, the PL spectrum 1510 has been acquired at temperature using a 20-mW GaN laser at about 405 nm and collecting the emission with a 27.5-cm focal length grating spectrograph equipped with a cooled charge-coupled device detector. In another example, the np-Si thin film is deposited on molybdenum substrate. As shown in FIG. 15, the curve 1510 exhibits a peak at 511 nm with a considerable red-shift from the peak of 420 nm for the hexane suspended silicon nanoparticles. This shift may be a result of uncontrolled oxidation of the directly deposited np-Si, or the excitation at the longer wavelength. To distinguish the effect of the latter, a PL spectrum of the hexane-suspended np-Si has been collected using an excitation wavelength of 405 nm. This spectrum is represented by a curve 1520 in FIG. 15, which shows a PL peak at approximately 465 nm, smaller than that seen for the directly deposited np-Si films. The difference may have resulted from surface oxidation of the films. Apparently, the octanol-capped nanoparticles suspended in hexane are protected from oxidation. Also, the sharp peak at 438 nm in FIG. 15 is an artifact of the cut-off filter used in the set-up.

Figure 16:
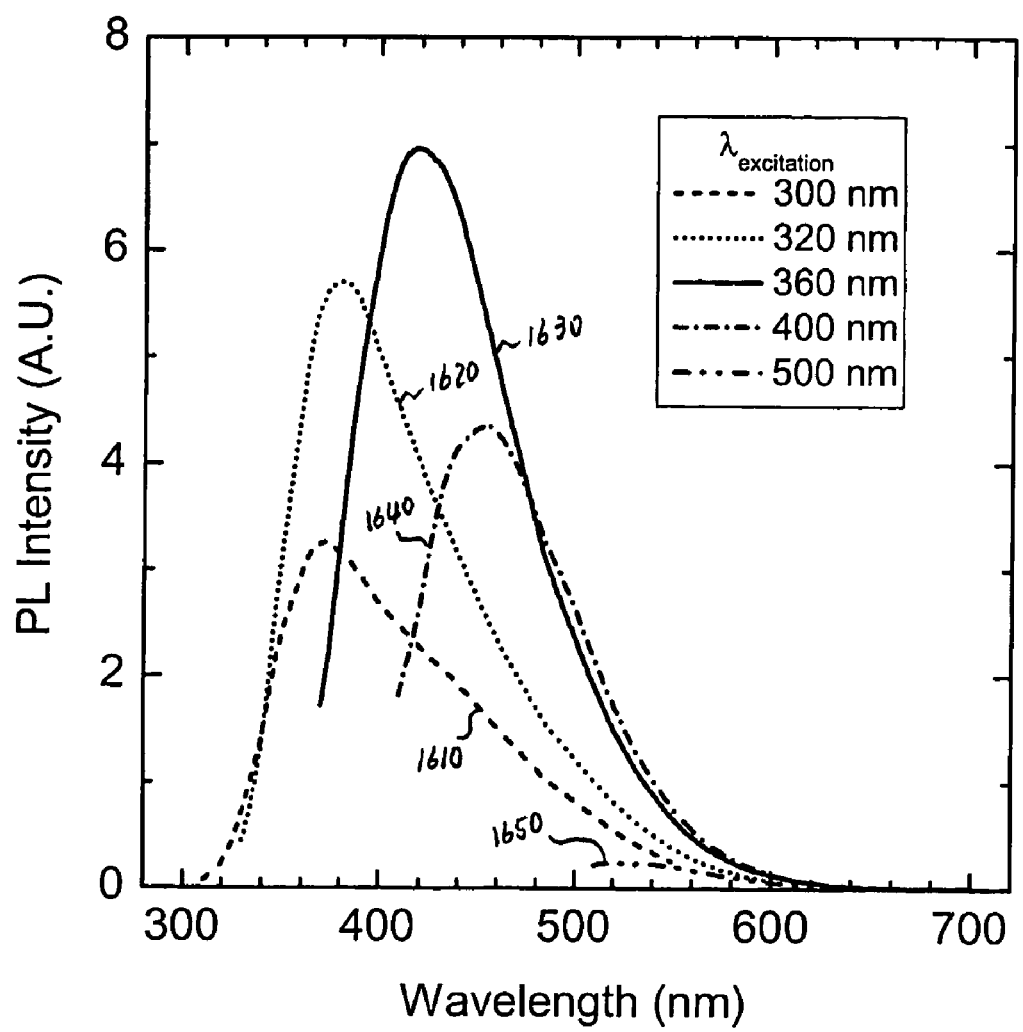
FIG. 16 shows simplified PL spectra as a function of excitation wavelength according to an embodiment of the present invention.

FIG. 16 shows simplified PL spectra as a function of excitation wavelength according to an embodiment of the present invention. This diagram is merely an example, which should not unduly limit the scope of the claims. One of ordinary skill in the art would recognize many variations, alternatives, and modifications. The silicon nanoparticles are synthesized by the method 300 with the system 200. Curves 1610, 1620, 1630, 1640, and 1650 represent PL spectra corresponding to excitation wavelengths of 300 nm, 320 nm, 360 nm, 400 nm, and 500 nm, respectively. As shown in FIG. 16, the emission spectra of np-Si in hexane are strongly dependent on the excitation wavelength. Although excitation at 370 nm results in the maximum PL emission, luminescence has been observed at other excitation wavelengths. As the excitation is increased from 300 to 400 nm, the emission peak shifted from 370 to 450 nm. Exciting at 500 nm has resulted in virtually no visible emission. The PL shift as a function of excitation wavelength is caused by the size distribution in the sample. At longer wavelengths, larger particles with lower HOMO→LUMO band gap energies are excited and the emission peak red-shifts. At wavelengths longer than 500 nm, the excitation energy is insufficient to excite any of the particles in the sample. Accordingly, the Stokes shift has been calculated as a function of the excitation wavelength as shown in Table 1.

TABLE 1

Emission energy and Stokes shift as a function of excitation energy for np-Si in hexane.

| Excitation Energy (eV) | Emission Energy (eV) | Stokes Shift (eV) |
| --- | --- | --- |
| 4.12 | 3.34 | 0.78 |
| 3.86 | 3.25 | 0.61 |
| 3.43 | 2.94 | 0.49 |
| 3.09 | 2.75 | 0.34 |
| 2.47 | 2.38 | 0.10 |

As the excitation energy is decreased, emission is obtained from larger particles in the sample. Therefore, the observed decrease in the Stokes shift can be inferred to be related to particle size. Calculations have shown a similar trend approximated by $E^{Stokes} \sim D^{-n}$ with the Stokes shift becoming independent of the size of the cluster at diameters larger than 3 mn. Because this parameter is related to a relaxation mechanism in the particle, it depends on specific bonds at the surface. For larger particle diameters, surface states have been observed to be inconsequential to PL emission. The sensitivity of the Stokes shift to particle size suggests that the silicon nanoparticles have a diameter of about 1 to 2 nm according to certain embodiments of the present invention. Particles in this size range have important implications in studies of the PL mechanism.

Figure 17:
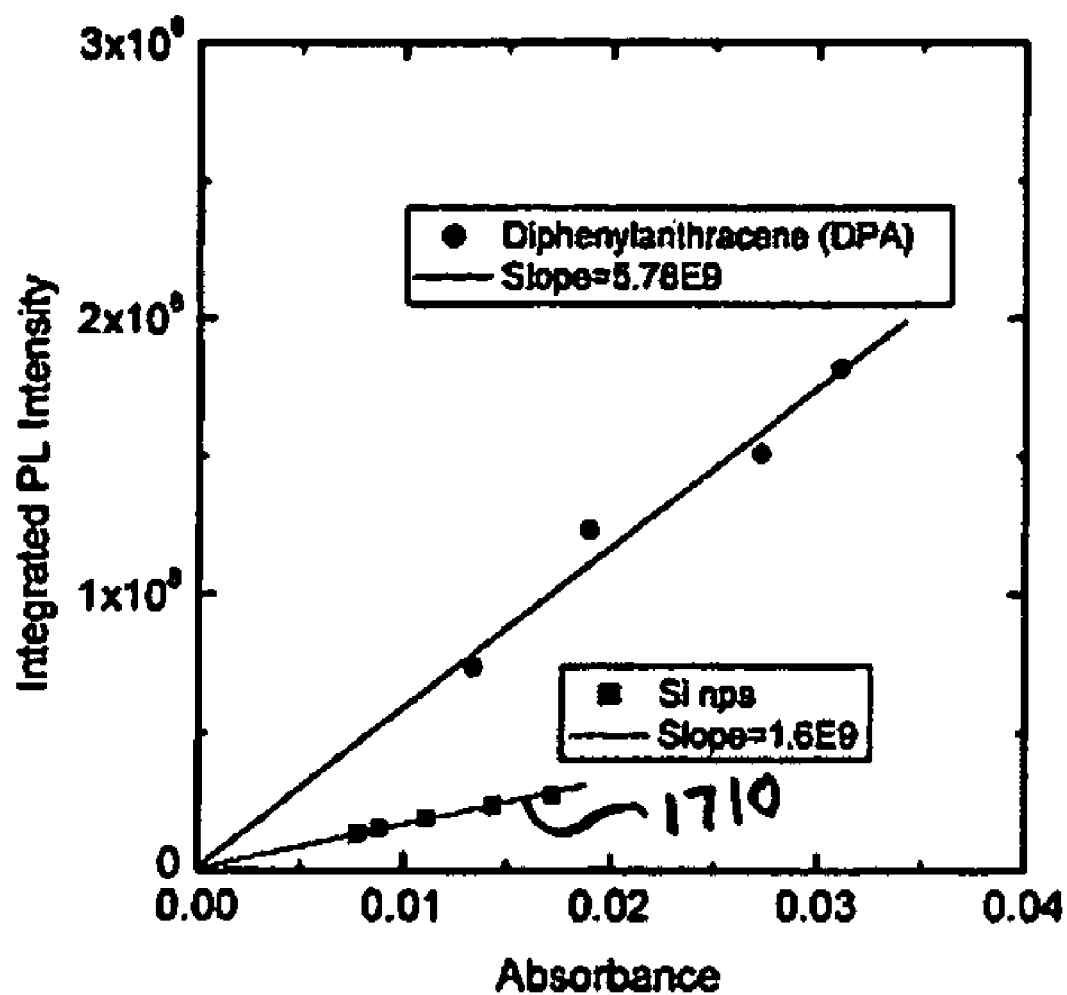
FIG. 17 is a simplified diagram showing quantum yield of silicon nanoparticles according to an embodiment of the present invention.

FIG. 17 is a simplified diagram showing quantum yield of silicon nanoparticles according to an embodiment of the present invention. This diagram is merely an example, which should not unduly limit the scope of the claims. One of ordinary skill in the art would recognize many variations, alternatives, and modifications. The silicon nanoparticles are synthesized by the method 300 with the system 200. To estimate the quantum efficiency of these nanoparticles, PL emission spectra have been collected for various particle dilutions. The integrated emission intensity for each sample is plotted in as a curve 1710 against the corresponding absorbance at the same excitation wavelength. Under the same excitation conditions, the same lamp energy, and the same spectrometer band-pass, similar measurements have also been performed for various dilutions of 9,10-diphenylanthracene in cyclohexane, which emits with a known efficiency of 90% between 400 and 500 nm. The experimental results are plotted as a curve 1720. As shown in FIG. 17, the curve 1710 has a slope of $1.6 \times 10^9$ based on linear fitting, and the curve 1720 has a slope of $5.78 \times 10^9$ also based on linear fitting. A comparison of these two slopes indicates that the quantum efficiency of the octanol-capped silicon nanoparticles is higher than 23% and equal to about 30%. As discussed above and emphasized here, the silicon nanoparticles used for this experiment are as-grown particles without any further processing or special treatments.

Figure 18:
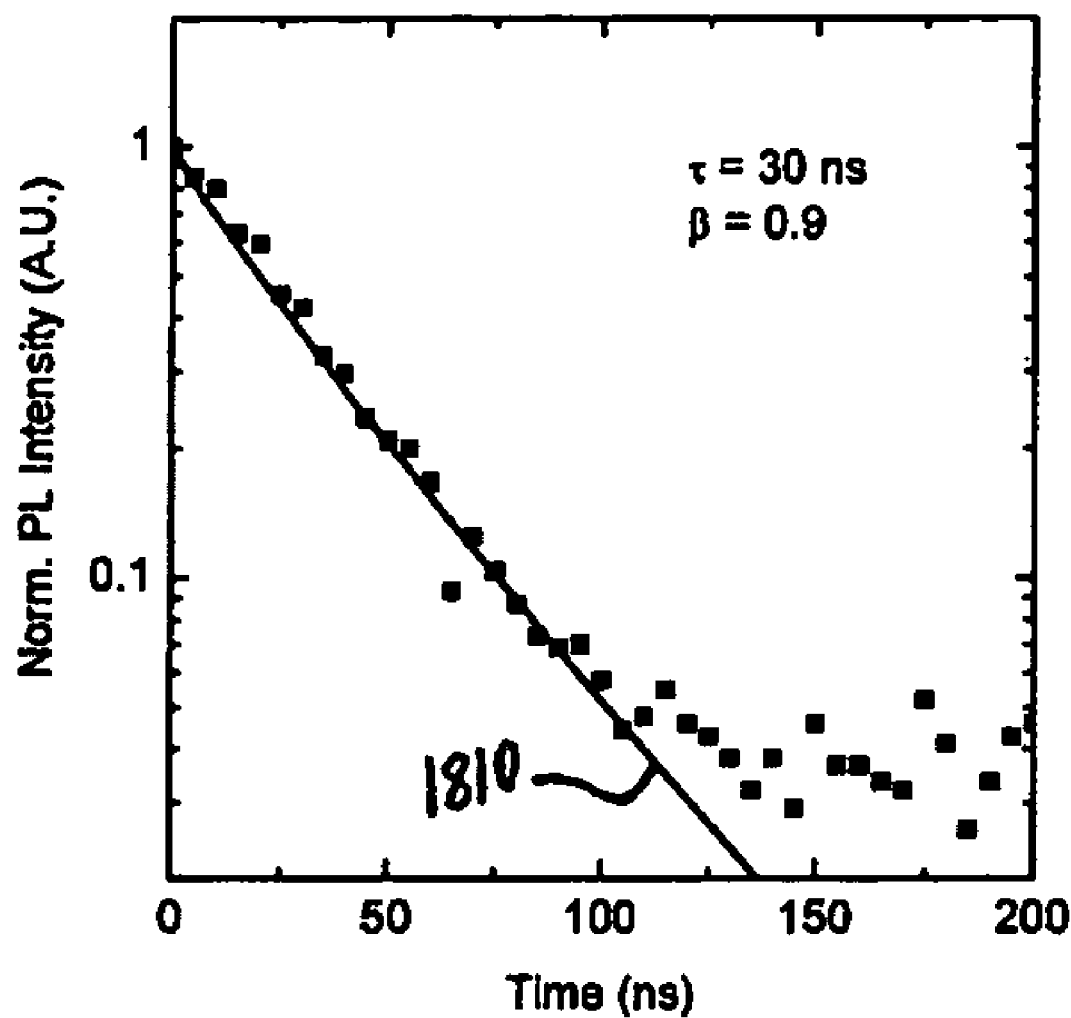
FIG. 18 is a simplified diagram showing life time of silicon nanoparticles according to an embodiment of the present invention.

FIG. 18 is a simplified diagram showing life time of silicon nanoparticles according to an embodiment of the present invention. This diagram is merely an example, which should not unduly limit the scope of the claims. One of ordinary skill in the art would recognize many variations, alternatives, and modifications. The silicon nanoparticles are synthesized by the method 300 with the system 200. The radioactive lifetime $\tau$ of the PL emission of as-grown silicon nanoparticles have been evaluated. PL decay measurements have been performed at 295 K by exciting np-Si in hexane with an Ar ion laser at 454.8 nm with a cw power density of 5 mW/mm$^2$ at the sample. The PL emission has been monitored at 570 nm through a cutoff filter at 500 nm. The beam has been pulsed at 1000 Hz using an acoustic optical modulator with 50% duty cycle and the data have been collected with a temporal resolution of 5 ns. The results, as shown in FIG. 18, can be approximated by a stretched exponential curve 1810 with $\tau=30$ ns and a stretch fitting parameter $\tau=0.9$. The obtained lifetime of 30 ns is longer than the lifetimes typically attributed to surface state recombination of electron-hole pairs but shorter than transitions believed to be associated with band-to-band recombination. For example, the lifetimes typically attributed to surface state recombination of electron-hole pairs are equal to or smaller than 1 ns, and transitions believed to be associated with band-to-band recombination usually take about 10 to 100 μs. While the light emission mechanism in np-Si is still under debate, it seems that both theory and experiment agree on a trend of decreasing PL lifetimes for smaller nanoparticles. For certain embodiments of the present invention, given the size of silicon nanoparticles, short lifetimes should be expected, perhaps even shorter than the 30 ns measured, which is based on an excitation wavelength that is significantly red-shifted from the excitation optimum.

As discussed above and further emphasized here, FIGS. 2-18 are merely examples, which should not unduly limit the scope of the claims. One of ordinary skill in the art would recognize many variations, alternatives, and modifications. For example, the aerosol synthesis route for nanoparticle growth can be adapted to different materials by changing the gas precursor, such as the gas 322 in FIG. 2. Consequently, the properties of silicon nanoparticles and other semiconductors can be compared. For example, while germanium is an indirect band gap material like silicon, it has a band gap energy of 0.76 eV as compared to 1.12 eV for silicon. Experimental investigations on Ge nanocrystals have shown quantum confinement effects similar to Si. Some studies have suggested that below a critical size, Ge nanoparticles should show stronger quantum confinement than Si. Measuring the PL of similarly sized particles can confirm if the band gap indeed shifts to higher energies.

According to an embodiment of the present invention, a system for making nanoparticles includes a first cathode including a first metal tube associated with a first end and a second end, a first anode including a second metal tube associated with a third end and a fourth end, and a first container including a first gas inlet. The first end and the third end are located inside the first container. The first end and the third end are separated by a first gap, the first metal tube is configured to allow a first gas to flow from the second end to the first end, and the first container is configured to allow a second gas to flow from the first gas inlet into the second metal tube through at least a first part of the first gap. The first cathode and the first anode are configured to generate a first plasma discharge at a first pressure equal to or higher than one atmospheric pressure, and the first plasma discharge is capable of being used for making a first plurality of nanoparticles. Additionally, the system, for example, includes a second cathode including a third metal tube associated with a fifth end and a sixth end, and a second anode including a fourth metal tube associated with a seventh end and an eighth end. The fifth end and the seventh end are separated by a second gap. The third metal tube is configured to allow a third gas to flow from the sixth end to the fifth end, and the second cathode and the second anode are configured to generate a second plasma discharge at a second pressure equal to or higher than one atmospheric pressure. The second plasma discharge is capable of being used for making a second plurality of nanoparticles. For example, the system is implemented according to the system 200.

According to another embodiment, a system for making nanoparticles includes a cathode including a first metal tube associated with a first inner diameter and including a first end and a second end, an anode including a second metal tube associated with a second inner diameter and including a third end and a fourth end, and a container including a gas inlet. The first end and the third end are located inside the container. The first end and the third end are separated by a gap, and the first container is configured to allow a gas to flow from the gas inlet into the second metal tube through at least a first part of the gap. The cathode and the anode are configured to generate a plasma discharge at a pressure equal to or higher than one atmospheric pressure, and the second inner diameter is lager than the first inner diameter. For example, the system is implemented according to the system 200.

According to yet another embodiment, a system for making nanoparticles includes a cathode including a first metal tube associated with a first end and a second end, an anode including a second metal tube associated with a third end and a fourth end, and a container, the first end and the third end being located inside the container. The first end and the third end are separated by a gap, and the first metal tube is configured to allow a gas to flow from the second end to the first end. The cathode and the anode are configured to generate a plasma discharge at a pressure equal to or higher than one atmospheric pressure, and the plasma discharge is capable of being used for making a plurality of nanoparticles. The first metal tube is associated with a first inner diameter, the second metal tube is associated with a second inner diameter, and the second inner diameter is lager than the first inner diameter. For example, the system is implemented according to the system 200.

According to yet another embodiment, a method for making nanoparticles includes providing a plasma microreactor. The plasma microreactor includes a cathode associated with a first end and a second end, an anode associated with a third end and a fourth end, and a container including a gas inlet. The first end and the third end are separated by a gap and located inside the container. Additionally, the method includes supplying a first gas flowing from the second end to the first end, supplying a second gas flowing from the gas inlet into the anode through at least a first part of the gap, starting a plasma discharge at a first pressure equal to or higher than one atmospheric pressure, and maintaining the plasma discharge at a second pressure equal to or higher than one atmospheric pressure. The maintaining the plasma discharge includes making a plurality of nanoparticles. For example, the method is implemented according to the method 300 using the system 200.

According to yet another embodiment, a method for making nanoparticles includes providing a plasma microreactor. The plasma microreactor includes a cathode associated with a first end and a second end, an anode associated with a third end and a fourth end, and a container. The first end and the third end are separated by a gap and located inside the container. Additionally, the method includes supplying a gas flowing from the second end to the first end, starting a plasma discharge at a first pressure equal to or higher than one atmospheric pressure, and maintaining the plasma discharge at a second pressure equal to or higher than one atmospheric pressure. The maintaining the plasma discharge includes making a plurality of nanoparticles. For example, the method is implemented according to the method 300 using the system 200.

The present invention has various advantages. Some embodiments of the present invention provide high-pressure microdischarges for the synthesis of nanometer-size silicon particles. For example, atmospheric-pressure microdischarges are used as short-residence time reactors for silicon nanoparticle synthesis. In one embodiment, the residence time of particle nucleation can be limited in the reactor to time scales on the order of milliseconds. In another example, charging of particles in plasma may prevent coagulation. In yet another example, high-pressure operation can accelerates particle growth.

Certain embodiments of the present invention can limit particle growth in the reaction zone allowing the production of ultrasmall nanoparticles with relatively narrow size distributions. For example, silicon nanoparticles are synthesized from a mixture of argon and silane in an atmospheric pressure plasma microreactor. Particles nucleate and grow to a few nanometers in diameter before their growth is abruptly terminated in the short afterglow. In another example, samples collected in solution can exhibit strong PL emission with a peak at 440 nm, indicative of particles with a core size smaller than 2 nm. In yet another example, size classification of the aerosol shows relatively narrow size distributions of agglomerates in the 2-5 nm range with $\sigma_g$=1.3. Some embodiments of the present invention collect silicon nanoparticles in solution immediately after synthesis. These collected particles exhibit strong blue photoluminescence that peaks at 420 nm, and the emission remains stable for months in ambient air. Certain embodiments of the present invention provide applications for luminescent properties of our np-Si in optical devices and fundamental studies to clarify the luminescence mechanism. Some embodiments of the present invention provide systems and methods whose synthetic routes can readily be applied to grow a range of metal and semiconductor nanoparticles.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for making nanoparticles, the system comprising:
a first cathode including a first metal tube, the first metal tube including a first end and a second end;
a first anode including a second metal tube, the second metal tube including a third end and a fourth end;
a first container including a first gas inlet, the first end and the third end being located inside the first container;
wherein:
the first end and the third end are separated by a first gap;
the first metal tube is configured to allow a first gas to flow from the second end to the first end;
the first container is configured to allow a second gas to flow from the first gas inlet into the second metal tube through at least a first part of the first gap;
the first cathode and the first anode are configured to generate a first plasma discharge at a first pressure equal to or higher than one atmospheric pressure;
the first plasma discharge is capable of being used for making a first plurality of nanoparticles.

2. The system of claim 1 wherein the first plurality of nanoparticles includes silicon nanoparticles.

3. The system of claim 1 wherein the first container comprises a first interface with the first metal tube and a second interface with the second metal tube.

4. The system of claim 1 wherein the second gas is a quench gas.

5. The system of claim 1 wherein the first plasma discharge is located in at least part of the first metal tube and at least a second part of the first gap.

6. The system of claim 5 wherein the first part of the first gap and the second part of the first gap are the same.

7. The system of claim 1 wherein:
the first metal tube is associated with a first inner diameter;
the second metal tube is associated with a second inner diameter;
the second inner diameter is lager than the first inner diameter.

8. The system of claim 7 wherein the second inner diameter is at least twice as large as the first inner diameter.

9. The system of claim 8 wherein the second inner diameter is at least three times as large as the first inner diameter.

10. The system of claim 7 wherein the first inner diameter ranges from 10 μm to 250 μm.

11. The system of claim 10 wherein the first inner diameter is equal to about 180 μm.

12. The system of claim 7 wherein the second inner diameter ranges from 0.5 mm to 2.0 mm.

13. The system of claim 12 wherein the second inner diameter is equal to about 1 mm.

14. The system of claim 1 wherein the first end and the third end are separated by a distance associated with the first gap, the distance ranging from 0.5 mm to 2 mm.

15. The system of claim 14 wherein the distance is equal to about 1 mm.

16. The system of claim 1 wherein:
the first tube is associated with a first length from the first end to the second end;
the second tube is associated with a second length from the third end to the fourth end;
the second length is shorter than the first length.

17. The system of claim 1 wherein:
the first metal tube is associated with a longitudinal direction from the first end and the second end;
with respect to the longitudinal direction, the gas inlet is located between the first end and the second end.

18. The system of claim 17 wherein with respect to the longitudinal direction, the gas inlet is located away from the first end by a distance ranging from 2 mm to 4 mm.

19. The system of claim 1, and further comprising a particle collector coupled to the second metal tube.

20. The system of claim 19 wherein the particle collector comprise a liquid.

21. The system of claim 19 wherein the particle collector comprises a substrate.

22. The system of claim 1, and further comprising a size classifier coupled to the second metal tube without any size selection.

23. The system of claim 22, and further comprising an electrometer coupled to the size classifier.

24. The system of claim 22 wherein the size classifier comprises a radial differential mobility analyzer.

25. The system of claim 24 wherein the radial differential mobility analyzer is configured to measure dimensions of the first plurality of nanoparticles.

26. The system of claim 25 wherein the dimensions with nanoparticle coagulation are associated with a mean value equal to about 2.9 nm and a standard deviation equal to about 1.32 nm.

27. The system of claim 1 wherein each of the first plurality of nanoparticles is associated with a dimension less than 100 nm.

28. The system of claim 27 wherein the dimension is equal to or less than 5 nm.

29. The system of claim 28 wherein the dimension is equal to or less than 2 nm.

30. The system of claim 1 wherein the nanoparticles are associated with a quantum yield higher than 23%.

31. The system of claim 30 wherein the quantum yield is equal to about 30%.

32. The system of claim 1, and further comprising:
a second cathode including a third metal tube associated with a fifth end and a sixth end;
a second anode including a fourth metal tube associated with a seventh end and an eighth end;
wherein:
the fifth end and the seventh end are separated by a second gap;
the third metal tube is configured to allow a third gas to flow from the sixth end to the fifth end;
the second cathode and the second anode are configured to generate a second plasma discharge at a second pressure equal to or higher than one atmospheric pressure;
the second plasma discharge is capable of being used for making a second plurality of nanoparticles.

33. The system of claim 32 wherein the first pressure and the second pressure are the same.

34. A system for making nanoparticles, the system comprising:
a cathode including a first metal tube associated with a first inner diameter and including a first end and a second end;
an anode including a second metal tube associated with a second inner diameter and including a third end and a fourth end;
a container including a gas inlet, the first end and the third end being located inside the container;
wherein:
the first end and the third end are separated by a gap;

the first container is configured to allow a gas to flow from the gas inlet into the second metal tube though at least a first part of the gap;

the cathode and the anode are configured to generate a plasma discharge at a pressure equal to or higher than one atmospheric pressure;

the second inner diameter is lager than the first inner diameter.

35. The system of claim 34 wherein the gas is a quench gas.

36. The system of claim 34 wherein the plasma discharge is located in at least part of the first metal tube and at least a second part of the gap.

37. The system of claim 34 wherein the second inner diameter is at least twice as large as the first inner diameter.

38. The system of claim 34 wherein the second inner diameter is at least three times as large as the first inner diameter.

39. The system of claim 34 wherein each of the first plurality of nanoparticles is associated with a dimension equal to or less than 5 nm.

40. The system of claim 39 wherein the dimension is equal to or less than 2 nm.

41. The system of claim 34 wherein the nanoparticles are associated with a quantum yield higher than 23%.

42. The system of claim 41 wherein the quantum yield is equal to about 30%.

43. A system for making nanoparticles, the system comprising:

a cathode including a first metal tube, the first metal tube including a first end and a second end;

an anode including a second metal tube, the second metal tube including a third end and a fourth end;

a container, the first end and the third end being located inside the container;

wherein:

the first end and the third end are separated by a gap;

the first metal tube is configured to allow a gas to flow from the second end to the first end;

the cathode and the anode are configured to generate a plasma discharge at a pressure equal to or higher than one atmospheric pressure;

the plasma discharge is capable of being used for making a plurality of nanoparticles;

the first metal tube is associated with a first inner diameter;

the second metal tube is associated with a second inner diameter; the second inner diameter is lager than the first inner diameter.

44. The system of claim 43 wherein the second inner diameter is at least twice as large as the first inner diameter.

45. The system of claim 44 wherein the second inner diameter is at least three times as large as the first inner diameter.

46. The system of claim 43 wherein the first inner diameter ranges from 10 μm to 250 μm.

47. The system of claim 46 wherein the first inner diameter is equal to about 180 μm.

48. The system of claim 43 wherein the second inner diameter ranges from 0.5 mm to 2.0 mm.

49. The system of claim 48 wherein the second inner diameter is equal to about 1 mm.

* * * * *